US012423121B1

(12) United States Patent
Gupta

(10) Patent No.: US 12,423,121 B1
(45) Date of Patent: Sep. 23, 2025

(54) SYSTEMS AND METHODS TO CUSTOMIZE A USER INTERFACE OF A COLLABORATION ENVIRONMENT BASED ON RANKING OF WORK UNIT RECORDS MANAGED BY THE COLLABORATION ENVIRONMENT

(71) Applicant: Asana, Inc., San Francisco, CA (US)

(72) Inventor: Sarang Gupta, Vancouver (CA)

(73) Assignee: Asana, Inc., San Francisco, CA (US)

( * ) Notice: Subject to any disclaimer, the term of this patent is extended or adjusted under 35 U.S.C. 154(b) by 95 days.

(21) Appl. No.: 18/505,469

(22) Filed: Nov. 9, 2023

(51) Int. Cl.
*G06F 9/451* (2018.01)
*H04L 67/306* (2022.01)

(52) U.S. Cl.
CPC ............ *G06F 9/451* (2018.02); *H04L 67/306* (2013.01)

(58) Field of Classification Search
CPC ............................... G06F 9/451; H04L 67/306
See application file for complete search history.

(56) References Cited

U.S. PATENT DOCUMENTS

| | | | |
|---|---|---|---|
| 5,233,687 | A | 8/1993 | Henderson, Jr. |
| 5,524,077 | A | 6/1996 | Faaland |
| 5,530,861 | A | 6/1996 | Diamant |
| 5,608,898 | A | 3/1997 | Turpin |
| 5,611,076 | A | 3/1997 | Durflinger |
| 5,623,404 | A | 4/1997 | Collins |
| 5,721,770 | A | 2/1998 | Kohler |
| 5,983,277 | A | 11/1999 | Heile |
| 6,024,093 | A | 2/2000 | Cron |
| 6,256,651 | B1 | 7/2001 | Tuli |
| 6,292,830 | B1 | 9/2001 | Taylor |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

"U.S. Appl. No. 14/584,750, Examiner Interview Summary mailed Feb. 25, 2016", 3 pgs.

(Continued)

*Primary Examiner* — Tadesse Hailu
(74) *Attorney, Agent, or Firm* — Esplin & Associates, PC

(57) ABSTRACT

Systems and methods to customize a user interface of a collaboration environment based on ranking of work unit records managed by the collaboration environment are described herein. Exemplary implementations may: manage environment state information maintaining a collaboration environment; determine user-level record interaction information characterizing interactions of individual ones of the users with individual ones of the work unit records; determine domain-level record interaction information characterizing the interactions of a set of the users with the individual ones of the work unit records; generate, for the individual ones of the users, rankings of the work unit records based on the user-level record interaction information and the domain-level record interaction information; effectuate presentation of instances of a user interface of the collaboration environment customized for individual users based on the rankings; and/or perform other operations.

20 Claims, 3 Drawing Sheets

(56) References Cited

U.S. PATENT DOCUMENTS

| | | |
|---|---|---|
| 6,332,147 B1 | 12/2001 | Moran |
| 6,385,639 B1 | 5/2002 | Togawa |
| 6,621,505 B1 | 9/2003 | Beauchamp |
| 6,629,081 B1 | 9/2003 | Cornelius |
| 6,769,013 B2 | 7/2004 | Frees |
| 6,859,523 B1 | 2/2005 | Jilk |
| 6,938,048 B1 | 8/2005 | Jilk |
| 7,003,668 B2 | 2/2006 | Berson |
| 7,020,697 B1 | 3/2006 | Goodman |
| 7,039,596 B1 | 5/2006 | Lu |
| 7,039,654 B1 | 5/2006 | Eder |
| 7,086,062 B1 | 8/2006 | Faour |
| 7,146,326 B1 | 12/2006 | White |
| 7,155,400 B1 | 12/2006 | Jilk |
| 7,349,920 B1 | 3/2008 | Feinberg |
| 7,386,797 B1 | 6/2008 | Chatterjee |
| 7,401,131 B2 | 7/2008 | Robertson |
| 7,418,482 B1 | 8/2008 | Lusher |
| 7,428,723 B2 | 9/2008 | Greene |
| 7,640,511 B1 | 12/2009 | Keel |
| 7,644,145 B2 | 1/2010 | Rockwell |
| 7,676,542 B2 | 3/2010 | Moser |
| 7,702,532 B2 | 4/2010 | Vigil |
| 7,778,866 B2 | 8/2010 | Hughes |
| 7,779,039 B2 | 8/2010 | Weissman |
| RE41,737 E | 9/2010 | Leem |
| 7,792,795 B1 | 9/2010 | Swartz |
| 7,805,327 B1 | 9/2010 | Schulz |
| RE41,848 E | 10/2010 | Daniell |
| 7,831,978 B2 | 11/2010 | Schaad |
| 7,840,943 B2 | 11/2010 | Volkov |
| 7,917,855 B1 | 3/2011 | Satish |
| 7,941,453 B1 | 5/2011 | Scheevel |
| 7,945,469 B2 | 5/2011 | Cohen |
| 7,996,744 B2 | 8/2011 | Ojala |
| 7,996,774 B1 | 8/2011 | Sidenur |
| 8,214,747 B1 | 7/2012 | Yankovich |
| 8,314,809 B1 | 11/2012 | Grabowski |
| 8,499,300 B2 | 7/2013 | Zimberg |
| 8,522,240 B1 | 8/2013 | Merwarth |
| 8,527,287 B1 | 9/2013 | Bhatia |
| 8,554,832 B1 | 10/2013 | Moskovitz |
| 8,572,477 B1 | 10/2013 | Moskovitz |
| 8,626,547 B2 | 1/2014 | Hirano |
| 8,627,199 B1 | 1/2014 | Handley |
| 8,639,552 B1 | 1/2014 | Chen |
| 8,738,414 B1 | 5/2014 | Nagar |
| 8,768,751 B2 | 7/2014 | Jakowski |
| 8,831,879 B2 | 9/2014 | Stamm |
| 8,843,832 B2 | 9/2014 | Frields |
| 8,863,021 B1 | 10/2014 | Bee |
| 9,009,096 B2 | 4/2015 | Pinckney |
| 9,024,752 B2 | 5/2015 | Tumayan |
| 9,143,839 B2 | 9/2015 | Reisman |
| 9,152,668 B1 | 10/2015 | Moskovitz |
| 9,201,952 B1 | 12/2015 | Chau |
| 9,208,262 B2 | 12/2015 | Bechtel |
| 9,251,484 B2 | 2/2016 | Cantor |
| 9,350,560 B2 | 5/2016 | Hupfer |
| 9,383,917 B2 | 7/2016 | Mouton |
| 9,405,532 B1 | 8/2016 | Sullivan |
| 9,405,810 B2 | 8/2016 | Smith |
| 9,454,623 B1 | 9/2016 | Kaptsan |
| 9,514,424 B2 | 12/2016 | Kleinbart |
| 9,600,136 B1 | 3/2017 | Yang |
| 9,674,361 B2 | 6/2017 | Ristock |
| 9,712,576 B1 | 7/2017 | Gill |
| 9,785,445 B2 | 10/2017 | Mitsui |
| 9,830,398 B2 | 11/2017 | Schneider |
| 9,842,312 B1 | 12/2017 | Rosati |
| 9,949,681 B2 | 4/2018 | Badenes |
| 9,953,282 B2 | 4/2018 | Shaouy |
| 9,959,420 B2 | 5/2018 | Kiang |
| 9,978,040 B2 | 5/2018 | Lee |
| 9,990,636 B1 | 6/2018 | Lewis |
| 10,001,911 B2 | 6/2018 | Breedvelt-Schouten |
| 10,003,693 B2 | 6/2018 | Wolthuis |
| 10,083,412 B2 | 9/2018 | Suntinger |
| 10,157,355 B2 | 12/2018 | Johnson |
| 10,192,181 B2 | 1/2019 | Katkar |
| 10,235,156 B2 | 3/2019 | Johnson |
| 10,264,067 B2 | 4/2019 | Subramani |
| 10,308,992 B2 | 6/2019 | Chauvin |
| 10,373,084 B2 | 8/2019 | Kurjanowicz |
| 10,373,090 B2 | 8/2019 | Holm |
| 10,382,501 B2 | 8/2019 | Malatesha |
| 10,455,011 B2 | 10/2019 | Kendall |
| 10,496,943 B2 | 12/2019 | De |
| 10,594,788 B2 | 3/2020 | Larabie-Belanger |
| 10,606,859 B2 | 3/2020 | Smith |
| 10,613,735 B1 | 4/2020 | Karpe |
| 10,616,151 B1 | 4/2020 | Cameron |
| 10,623,359 B1 | 4/2020 | Rosenstein |
| 10,671,692 B2 | 6/2020 | Koopman |
| 10,684,870 B1 | 6/2020 | Sabo |
| 10,706,484 B1 | 7/2020 | Murnock |
| 10,785,046 B1 | 9/2020 | Raghavan |
| 10,810,222 B2 | 10/2020 | Koch |
| 10,846,105 B2 | 11/2020 | Granot |
| 10,846,297 B2 | 11/2020 | Smith |
| 10,922,104 B2 | 2/2021 | Sabo |
| 10,956,845 B1 | 3/2021 | Sabo |
| 10,970,299 B2 | 4/2021 | Smith |
| 10,977,434 B2 | 4/2021 | Pelz |
| 10,983,685 B2 | 4/2021 | Karpe |
| 11,082,281 B2 | 8/2021 | Justin |
| 11,095,468 B1 | 8/2021 | Pandey |
| 11,113,667 B1 | 9/2021 | Jiang |
| 11,138,021 B1 | 10/2021 | Rosenstein |
| 11,140,174 B2 | 10/2021 | Patel |
| 11,204,683 B1 | 12/2021 | Sabo |
| 11,212,242 B2 | 12/2021 | Cameron |
| 11,212,326 B2 | 12/2021 | Faulkner |
| 11,263,228 B2 | 3/2022 | Koch |
| 11,288,081 B2 | 3/2022 | Sabo |
| 11,290,296 B2 | 3/2022 | Raghavan |
| 11,327,645 B2 | 5/2022 | Karpe |
| 11,341,444 B2 | 5/2022 | Sabo |
| 11,341,445 B1 | 5/2022 | Cheng |
| 11,783,253 B1 * | 10/2023 | Pelz .................. G06Q 10/06316 705/7.26 |
| 2002/0065798 A1 | 5/2002 | Bostleman |
| 2002/0082889 A1 | 6/2002 | Oliver |
| 2002/0120480 A1 | 8/2002 | Kroeger |
| 2002/0143594 A1 | 10/2002 | Kroeger |
| 2003/0028595 A1 | 2/2003 | Vogt |
| 2003/0036934 A1 | 2/2003 | Ouchi |
| 2003/0041317 A1 | 2/2003 | Sokolov |
| 2003/0097406 A1 | 5/2003 | Stafford |
| 2003/0097410 A1 | 5/2003 | Atkins |
| 2003/0126001 A1 | 7/2003 | Northcutt |
| 2003/0200223 A1 | 10/2003 | Hack |
| 2003/0225598 A1 | 12/2003 | Yu |
| 2003/0233265 A1 | 12/2003 | Lee |
| 2003/0233268 A1 | 12/2003 | Taqbeem |
| 2004/0083448 A1 | 4/2004 | Schulz |
| 2004/0093290 A1 | 5/2004 | Doss |
| 2004/0093351 A1 | 5/2004 | Lee |
| 2004/0098291 A1 | 5/2004 | Newburn |
| 2004/0125150 A1 | 7/2004 | Adcock |
| 2004/0162833 A1 | 8/2004 | Jones |
| 2004/0187089 A1 | 9/2004 | Schulz |
| 2004/0207249 A1 | 10/2004 | Baumgartner |
| 2004/0230447 A1 | 11/2004 | Schwerin-Wenzel |
| 2004/0233235 A1 | 11/2004 | Rubin |
| 2004/0268451 A1 | 12/2004 | Robbin |
| 2005/0144232 A1 * | 6/2005 | Estrada .................. G06Q 10/10 709/204 |
| 2005/0204297 A1 * | 9/2005 | Banatwala ............. G06Q 10/10 715/752 |
| 2005/0210394 A1 | 9/2005 | Crandall |
| 2005/0216111 A1 | 9/2005 | Ooshima |
| 2005/0216324 A1 | 9/2005 | Maithell |

(56) References Cited

U.S. PATENT DOCUMENTS

| | | |
|---|---|---|
| 2005/0216381 A1* | 9/2005 | Banatwala ......... G06Q 20/3674 705/34 |
| 2005/0222971 A1 | 10/2005 | Cary |
| 2006/0028917 A1 | 2/2006 | Wigginton |
| 2006/0041447 A1 | 2/2006 | Vucina |
| 2006/0047454 A1 | 3/2006 | Tamaki |
| 2006/0085245 A1 | 4/2006 | Takatsuka |
| 2006/0095859 A1 | 5/2006 | Bocking |
| 2006/0136441 A1 | 6/2006 | Fujisaki |
| 2006/0143270 A1 | 6/2006 | Wodtke |
| 2006/0167736 A1 | 7/2006 | Weiss |
| 2006/0190391 A1 | 8/2006 | Cullen |
| 2006/0200264 A1 | 9/2006 | Kodama |
| 2006/0218551 A1 | 9/2006 | Berstis |
| 2006/0224430 A1 | 10/2006 | Butt |
| 2006/0277487 A1 | 12/2006 | Poulsen |
| 2007/0016646 A1 | 1/2007 | Tendjoukian |
| 2007/0025567 A1 | 2/2007 | Fehr |
| 2007/0038494 A1 | 2/2007 | Kreitzberg |
| 2007/0041542 A1 | 2/2007 | Schramm |
| 2007/0050225 A1 | 3/2007 | Leslie |
| 2007/0073575 A1 | 3/2007 | Yomogida |
| 2007/0143169 A1 | 6/2007 | Grant |
| 2007/0147178 A1 | 6/2007 | Masuda |
| 2007/0150327 A1 | 6/2007 | Dromgold |
| 2007/0232278 A1 | 10/2007 | May |
| 2007/0255674 A1 | 11/2007 | Mahoney |
| 2007/0255715 A1 | 11/2007 | Li |
| 2007/0260499 A1 | 11/2007 | Greef |
| 2007/0288283 A1 | 12/2007 | Fitzpatrick |
| 2007/0294344 A1 | 12/2007 | Mohan |
| 2008/0033777 A1 | 2/2008 | Shukoor |
| 2008/0046471 A1 | 2/2008 | Moore |
| 2008/0052358 A1 | 2/2008 | Beaven |
| 2008/0079730 A1 | 4/2008 | Zhang |
| 2008/0082389 A1 | 4/2008 | Gura |
| 2008/0082956 A1 | 4/2008 | Gura |
| 2008/0091782 A1 | 4/2008 | Jakobson |
| 2008/0114809 A1 | 5/2008 | MacBeth |
| 2008/0120129 A1 | 5/2008 | Seubert |
| 2008/0126930 A1 | 5/2008 | Scott |
| 2008/0134069 A1 | 6/2008 | Horvitz |
| 2008/0155547 A1 | 6/2008 | Weber |
| 2008/0158023 A1 | 7/2008 | Chung |
| 2008/0167937 A1 | 7/2008 | Coughlin |
| 2008/0175104 A1 | 7/2008 | Grieb |
| 2008/0195964 A1 | 8/2008 | Randell |
| 2008/0221946 A1 | 9/2008 | Balon |
| 2008/0222566 A1 | 9/2008 | Daughtrey |
| 2008/0244582 A1 | 10/2008 | Brown |
| 2008/0268876 A1 | 10/2008 | Gelfand |
| 2008/0270198 A1 | 10/2008 | Graves |
| 2008/0281665 A1 | 11/2008 | Opaluch |
| 2008/0313004 A1 | 12/2008 | Ryan |
| 2009/0048986 A1 | 2/2009 | Anderson |
| 2009/0055796 A1 | 2/2009 | Springborn |
| 2009/0076878 A1 | 3/2009 | Woerner |
| 2009/0089133 A1 | 4/2009 | Johnson |
| 2009/0094623 A1 | 4/2009 | Chakra |
| 2009/0113310 A1 | 4/2009 | Appleyard |
| 2009/0133027 A1 | 5/2009 | Gunning |
| 2009/0167553 A1 | 7/2009 | Hong |
| 2009/0187454 A1 | 7/2009 | Khasin |
| 2009/0199192 A1 | 8/2009 | Laithwaite |
| 2009/0204463 A1 | 8/2009 | Burnett |
| 2009/0204471 A1 | 8/2009 | Elenbaas |
| 2009/0234699 A1 | 9/2009 | Steinglass |
| 2009/0241053 A1 | 9/2009 | Augustine |
| 2009/0260010 A1 | 10/2009 | Burkhart |
| 2009/0287523 A1 | 11/2009 | Lau |
| 2009/0296908 A1 | 12/2009 | Lee |
| 2009/0299803 A1 | 12/2009 | Lakritz |
| 2009/0307319 A1 | 12/2009 | Dholakia |
| 2009/0307349 A1 | 12/2009 | Harris |
| 2010/0005087 A1 | 1/2010 | Basco |
| 2010/0070888 A1 | 3/2010 | Watabe |
| 2010/0088137 A1 | 4/2010 | Weiss |
| 2010/0106627 A1 | 4/2010 | O'Sullivan |
| 2010/0114786 A1 | 5/2010 | Aboujaoude |
| 2010/0115523 A1 | 5/2010 | Kuschel |
| 2010/0122334 A1 | 5/2010 | Stanzione |
| 2010/0131860 A1 | 5/2010 | Dehaan |
| 2010/0145801 A1 | 6/2010 | Chekuri |
| 2010/0169146 A1 | 7/2010 | Hoyne |
| 2010/0169802 A1 | 7/2010 | Goldstein |
| 2010/0169832 A1 | 7/2010 | Chang |
| 2010/0180212 A1 | 7/2010 | Gingras |
| 2010/0223575 A1 | 9/2010 | Leukart |
| 2010/0269049 A1 | 10/2010 | Fearon |
| 2010/0299171 A1 | 11/2010 | Lau |
| 2010/0312605 A1 | 12/2010 | Mitchell |
| 2010/0313151 A1 | 12/2010 | Wei |
| 2011/0015961 A1 | 1/2011 | Chan |
| 2011/0022662 A1 | 1/2011 | Barber-Mingo |
| 2011/0054968 A1 | 3/2011 | Galaviz |
| 2011/0055177 A1 | 3/2011 | Chakra |
| 2011/0060720 A1 | 3/2011 | Devereux |
| 2011/0069643 A1* | 3/2011 | Yoakum ............... H04L 65/4015 370/261 |
| 2011/0071878 A1 | 3/2011 | Gingras |
| 2011/0071893 A1 | 3/2011 | Malhotra |
| 2011/0072372 A1 | 3/2011 | Fritzley |
| 2011/0093538 A1 | 4/2011 | Weir |
| 2011/0093619 A1 | 4/2011 | Nelson |
| 2011/0113365 A1 | 5/2011 | Kimmerly |
| 2011/0154216 A1 | 6/2011 | Aritsuka |
| 2011/0161128 A1 | 6/2011 | Barney |
| 2011/0184768 A1 | 7/2011 | Norton |
| 2011/0270644 A1 | 11/2011 | Roncolato |
| 2011/0307100 A1 | 12/2011 | Schmidtke |
| 2011/0307772 A1 | 12/2011 | Lloyd |
| 2012/0030194 A1 | 2/2012 | Jain |
| 2012/0035942 A1 | 2/2012 | Graupner |
| 2012/0054095 A1* | 3/2012 | Lesandro ............... G06Q 20/12 705/39 |
| 2012/0066030 A1 | 3/2012 | Limpert |
| 2012/0066411 A1 | 3/2012 | Jeide |
| 2012/0072251 A1 | 3/2012 | Mircean |
| 2012/0079449 A1 | 3/2012 | Sanderson |
| 2012/0110087 A1 | 5/2012 | Culver |
| 2012/0117499 A1 | 5/2012 | Mori |
| 2012/0123835 A1 | 5/2012 | Chu |
| 2012/0131191 A1 | 5/2012 | May |
| 2012/0158946 A1 | 6/2012 | Shafiee |
| 2012/0192086 A1 | 7/2012 | Ghods |
| 2012/0221963 A1 | 8/2012 | Motoyama |
| 2012/0239451 A1 | 9/2012 | Caligor |
| 2012/0254218 A1 | 10/2012 | Ali |
| 2012/0266068 A1 | 10/2012 | Ryman |
| 2012/0278388 A1 | 11/2012 | Kleinbart |
| 2012/0296993 A1 | 11/2012 | Heyman |
| 2012/0304187 A1 | 11/2012 | Maresh |
| 2012/0317108 A1 | 12/2012 | Okazaki |
| 2013/0007332 A1 | 1/2013 | Teh |
| 2013/0013560 A1 | 1/2013 | Goldberg |
| 2013/0014023 A1 | 1/2013 | Lee |
| 2013/0018688 A1 | 1/2013 | Nudd |
| 2013/0021629 A1 | 1/2013 | Kurilin |
| 2013/0066944 A1 | 3/2013 | Laredo |
| 2013/0067375 A1 | 3/2013 | Kim |
| 2013/0067549 A1 | 3/2013 | Caldwell |
| 2013/0073328 A1 | 3/2013 | Ehrler |
| 2013/0103412 A1 | 4/2013 | Nudd |
| 2013/0124638 A1 | 5/2013 | Barreto |
| 2013/0151421 A1 | 6/2013 | Van Der Ploeg |
| 2013/0151604 A1 | 6/2013 | Ranade |
| 2013/0173486 A1 | 7/2013 | Peters |
| 2013/0179208 A1 | 7/2013 | Chung |
| 2013/0179799 A1 | 7/2013 | Savage |
| 2013/0215116 A1 | 8/2013 | Siddique |
| 2013/0227007 A1 | 8/2013 | Savage |
| 2013/0246110 A1 | 9/2013 | Nakhayi Ashtiani |
| 2013/0246399 A1 | 9/2013 | Schneider |
| 2013/0254299 A1 | 9/2013 | Burshtein |

(56) References Cited

U.S. PATENT DOCUMENTS

| | | |
|---|---|---|
| 2013/0275229 A1 | 10/2013 | Moganti |
| 2013/0279685 A1 | 10/2013 | Kohler |
| 2013/0317871 A1 | 11/2013 | Kulkarni |
| 2013/0321467 A1 | 12/2013 | Tappen |
| 2013/0339099 A1 | 12/2013 | Aidroos |
| 2013/0339831 A1 | 12/2013 | Gulanikar |
| 2014/0007005 A1 | 1/2014 | Libin |
| 2014/0012603 A1 | 1/2014 | Scanlon |
| 2014/0025767 A1 | 1/2014 | De Kezel |
| 2014/0036639 A1 | 2/2014 | Boni |
| 2014/0040780 A1 | 2/2014 | Artzt |
| 2014/0040905 A1 | 2/2014 | Tsunoda |
| 2014/0058801 A1 | 2/2014 | Deodhar |
| 2014/0059910 A1 | 3/2014 | Norton |
| 2014/0074536 A1 | 3/2014 | Meushar |
| 2014/0089719 A1 | 3/2014 | Daum |
| 2014/0101310 A1 | 4/2014 | Savage |
| 2014/0156539 A1 | 6/2014 | Brunet |
| 2014/0165001 A1 | 6/2014 | Shapiro |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0215344 A1 | 7/2014 | Ligman |
| 2014/0229609 A1 | 8/2014 | Wong |
| 2014/0236663 A1 | 8/2014 | Smith |
| 2014/0244334 A1 | 8/2014 | De |
| 2014/0257894 A1 | 9/2014 | Melahn |
| 2014/0279294 A1 | 9/2014 | Field-Darragh |
| 2014/0288987 A1 | 9/2014 | Liu |
| 2014/0310047 A1 | 10/2014 | De |
| 2014/0310051 A1 | 10/2014 | Meng |
| 2014/0350997 A1 | 11/2014 | Holm |
| 2014/0364987 A1 | 12/2014 | Shikano |
| 2015/0006448 A1 | 1/2015 | Gupta |
| 2015/0007058 A1 | 1/2015 | Wooten |
| 2015/0012330 A1 | 1/2015 | Sugiura |
| 2015/0052437 A1 | 2/2015 | Crawford |
| 2015/0058053 A1 | 2/2015 | De |
| 2015/0113540 A1 | 4/2015 | Rabinovici |
| 2015/0134393 A1 | 5/2015 | De |
| 2015/0149173 A1* | 5/2015 | Korycki .............. G10L 17/00 704/246 |
| 2015/0153906 A1 | 6/2015 | Liao |
| 2015/0178666 A1 | 6/2015 | Green |
| 2015/0213411 A1 | 7/2015 | Swanson |
| 2015/0215256 A1 | 7/2015 | Ghafourifar |
| 2015/0262111 A1 | 9/2015 | Yu |
| 2015/0294245 A1 | 10/2015 | Nagar |
| 2015/0312375 A1 | 10/2015 | Valey |
| 2015/0317595 A1 | 11/2015 | De |
| 2015/0339006 A1 | 11/2015 | Chaland |
| 2015/0358468 A1 | 12/2015 | Erhart |
| 2015/0363092 A1 | 12/2015 | Morton |
| 2015/0363733 A1 | 12/2015 | Brown |
| 2015/0379472 A1 | 12/2015 | Gilmour |
| 2016/0012368 A1 | 1/2016 | O'Connell |
| 2016/0048408 A1 | 2/2016 | Madhu |
| 2016/0048786 A1 | 2/2016 | Fukuda |
| 2016/0063192 A1 | 3/2016 | Johnson |
| 2016/0063449 A1 | 3/2016 | Duggan |
| 2016/0072750 A1 | 3/2016 | Kass |
| 2016/0110670 A1 | 4/2016 | Chatterjee |
| 2016/0124775 A1 | 5/2016 | Ashtiani |
| 2016/0140474 A1 | 5/2016 | Vekker |
| 2016/0140501 A1 | 5/2016 | Figlin |
| 2016/0147773 A1 | 5/2016 | Smith |
| 2016/0147846 A1 | 5/2016 | Smith |
| 2016/0148157 A1 | 5/2016 | Walia |
| 2016/0162819 A1 | 6/2016 | Hakman |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Gabor |
| 2016/0216854 A1 | 7/2016 | McClellan |
| 2016/0224939 A1 | 8/2016 | Chen |
| 2016/0234391 A1 | 8/2016 | Wolthuis |
| 2016/0275436 A1 | 9/2016 | Kurjanowicz |
| 2016/0292620 A1 | 10/2016 | De |
| 2016/0300024 A1 | 10/2016 | Janssen |
| 2016/0313934 A1 | 10/2016 | Isherwood |
| 2016/0328217 A1 | 11/2016 | Hagerty |
| 2016/0342927 A1 | 11/2016 | Reznik |
| 2016/0352812 A1 | 12/2016 | Ahlgren |
| 2017/0004213 A1 | 1/2017 | Cunico |
| 2017/0009387 A1 | 1/2017 | Ge |
| 2017/0017364 A1 | 1/2017 | Kekki |
| 2017/0017924 A1 | 1/2017 | Kashiwagi |
| 2017/0039503 A1 | 2/2017 | Jones |
| 2017/0052656 A1 | 2/2017 | Ohsumi |
| 2017/0061341 A1 | 3/2017 | Haas |
| 2017/0068933 A1 | 3/2017 | Norton |
| 2017/0093874 A1 | 3/2017 | Uthe |
| 2017/0099296 A1 | 4/2017 | Fisher |
| 2017/0103369 A1 | 4/2017 | Thompson |
| 2017/0116552 A1 | 4/2017 | Deodhar |
| 2017/0132200 A1 | 5/2017 | Noland |
| 2017/0147960 A1 | 5/2017 | Jahagirdar |
| 2017/0153799 A1 | 6/2017 | Hoyer |
| 2017/0154024 A1 | 6/2017 | Subramanya |
| 2017/0177671 A1 | 6/2017 | Allgaier |
| 2017/0185592 A1 | 6/2017 | Frei |
| 2017/0192642 A1 | 7/2017 | Fishman |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323267 A1 | 11/2017 | Baek |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2018/0032524 A1 | 2/2018 | Byron |
| 2018/0052943 A1 | 2/2018 | Hui |
| 2018/0053127 A1 | 2/2018 | Boileau |
| 2018/0059910 A1 | 3/2018 | Wooten |
| 2018/0060785 A1 | 3/2018 | Carnevale |
| 2018/0060818 A1 | 3/2018 | Ishiyama |
| 2018/0063063 A1 | 3/2018 | Yan |
| 2018/0068271 A1 | 3/2018 | Abebe |
| 2018/0075387 A1 | 3/2018 | Kulkarni |
| 2018/0088754 A1 | 3/2018 | Psenka |
| 2018/0089625 A1 | 3/2018 | Rosati |
| 2018/0095938 A1 | 4/2018 | Monte |
| 2018/0102989 A1 | 4/2018 | Borsutsky |
| 2018/0131649 A1 | 5/2018 | Ma |
| 2018/0157477 A1 | 6/2018 | Johnson |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225795 A1 | 8/2018 | Napoli |
| 2018/0247352 A1 | 8/2018 | Rogers |
| 2018/0260081 A1* | 9/2018 | Beaudoin ............ G06F 3/04817 |
| 2018/0262620 A1 | 9/2018 | Wolthuis |
| 2018/0285149 A1 | 10/2018 | Bhandari |
| 2018/0285471 A1 | 10/2018 | Hao |
| 2018/0315491 A1 | 11/2018 | Filipovich |
| 2018/0316636 A1 | 11/2018 | Kamat |
| 2018/0331842 A1 | 11/2018 | Faulkner |
| 2018/0357049 A1 | 12/2018 | Epstein |
| 2018/0365626 A1 | 12/2018 | Mansour |
| 2018/0367477 A1 | 12/2018 | Hariram |
| 2018/0367483 A1 | 12/2018 | Rodriguez |
| 2018/0373804 A1 | 12/2018 | Zhang |
| 2019/0005048 A1 | 1/2019 | Crivello |
| 2019/0014070 A1 | 1/2019 | Mertvetsov |
| 2019/0018552 A1 | 1/2019 | Bloy |
| 2019/0034057 A1 | 1/2019 | Rudchenko |
| 2019/0068390 A1 | 2/2019 | Gross |
| 2019/0079909 A1 | 3/2019 | Purandare |
| 2019/0080289 A1 | 3/2019 | Kreitler |
| 2019/0095839 A1 | 3/2019 | Itabayashi |

(56) References Cited

U.S. PATENT DOCUMENTS

| | | |
|---|---|---|
| 2019/0095846 A1 | 3/2019 | Gupta |
| 2019/0102700 A1 | 4/2019 | Babu |
| 2019/0138583 A1 | 5/2019 | Silk |
| 2019/0138589 A1 | 5/2019 | Udell |
| 2019/0138961 A1 | 5/2019 | Santiago |
| 2019/0139004 A1 | 5/2019 | Vukovic |
| 2019/0147386 A1 | 5/2019 | Balakrishna |
| 2019/0187987 A1 | 6/2019 | Fauchère |
| 2019/0197487 A1 | 6/2019 | Jersin |
| 2019/0213509 A1 | 7/2019 | Burleson |
| 2019/0265821 A1 | 8/2019 | Pearl |
| 2019/0286462 A1 | 9/2019 | Bodnick |
| 2019/0340166 A1 | 11/2019 | Raman |
| 2019/0340296 A1 | 11/2019 | Cunico |
| 2019/0340574 A1 | 11/2019 | Ekambaram |
| 2019/0347094 A1 | 11/2019 | Sullivan |
| 2019/0347126 A1 | 11/2019 | Bhandari |
| 2019/0370320 A1 | 12/2019 | Kalra |
| 2020/0019907 A1 | 1/2020 | Notani |
| 2020/0059539 A1 | 2/2020 | Wang |
| 2020/0063333 A1 | 2/2020 | Mahanty |
| 2020/0065736 A1 | 2/2020 | Relangi |
| 2020/0159507 A1 | 5/2020 | Bodin |
| 2020/0160270 A1 | 5/2020 | Bodin |
| 2020/0160377 A1 | 5/2020 | Bodin |
| 2020/0160458 A1 | 5/2020 | Bodin |
| 2020/0162315 A1 | 5/2020 | Siddiqi |
| 2020/0192538 A1 | 6/2020 | Karpe |
| 2020/0192908 A1 | 6/2020 | Smith |
| 2020/0193556 A1 | 6/2020 | Jin |
| 2020/0218551 A1 | 7/2020 | Sabo |
| 2020/0219061 A1 | 7/2020 | Guo |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0293975 A1 | 9/2020 | Faulkner |
| 2020/0328906 A1 | 10/2020 | Raghavan |
| 2020/0344253 A1 | 10/2020 | Kurup |
| 2021/0004380 A1 | 1/2021 | Koch |
| 2021/0004381 A1 | 1/2021 | Smith |
| 2021/0097466 A1 | 4/2021 | Sabo |
| 2021/0103451 A1 | 4/2021 | Sabo |
| 2021/0110347 A1 | 4/2021 | Khalil |
| 2021/0136012 A1 | 5/2021 | Barbitta |
| 2021/0150135 A1 | 5/2021 | Lereya |
| 2021/0150489 A1 | 5/2021 | Haramati |
| 2021/0157978 A1 | 5/2021 | Haramati |
| 2021/0166339 A1 | 6/2021 | Mann |
| 2021/0182475 A1 | 6/2021 | Pelz |
| 2021/0216562 A1 | 7/2021 | Smith |
| 2021/0232282 A1 | 7/2021 | Karpe |
| 2021/0248161 A1 | 8/2021 | Leston |
| 2021/0319389 A1 | 10/2021 | Jafari |
| 2021/0320891 A1 | 10/2021 | Rosenstein |
| 2021/0342785 A1 | 11/2021 | Mann |
| 2021/0342786 A1 | 11/2021 | Jiang |
| 2021/0350303 A1 | 11/2021 | Omar |
| 2021/0357380 A1 | 11/2021 | Morad |
| 2021/0357423 A1 | 11/2021 | Haramati |
| 2021/0357862 A1 | 11/2021 | Lereya |
| 2021/0357863 A1 | 11/2021 | Cohen |
| 2021/0382734 A1 | 12/2021 | Rosenstein |
| 2021/0383261 A1 | 12/2021 | Hanna |
| 2021/0390486 A1 | 12/2021 | Chu |
| 2022/0019320 A1 | 1/2022 | Sabo |
| 2022/0058548 A1 | 2/2022 | Garg |
| 2022/0075792 A1 | 3/2022 | Koch |
| 2022/0078142 A1 | 3/2022 | Cameron |
| 2022/0158859 A1 | 5/2022 | Raghavan |
| 2022/0171637 A1 | 6/2022 | Sabo |
| 2022/0188715 A1 | 6/2022 | Cheng |
| 2022/0214787 A1 | 7/2022 | Karpe |
| 2022/0215315 A1 | 7/2022 | Sabo |
| 2022/0284340 A1 | 9/2022 | Choudhary |
| 2022/0343282 A1 | 10/2022 | Hood |
| 2022/0414323 A1 | 12/2022 | Sreenivasan |
| 2023/0118369 A1 | 4/2023 | Sabo |
| 2023/0153732 A1 | 5/2023 | Akers |
| 2023/0239261 A1 | 7/2023 | Cameron |
| 2023/0308409 A1 | 9/2023 | Rosenstein |
| 2023/0325747 A1 | 10/2023 | Sabo |
| 2024/0223517 A1 | 7/2024 | Cameron |
| 2024/0323106 A1 | 9/2024 | Mann |
| 2024/0346407 A1 | 10/2024 | Matson |
| 2024/0420087 A1 | 12/2024 | Sabo |
| 2025/0200143 A1 | 6/2025 | Varghese |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

"U.S. Appl. No. 14/584,750, Non Final Office Action mailed Aug. 28, 2015", 21 pgs.

"U.S. Appl. No. 14/584,750, Notice of Allowance mailed Mar. 28, 2016", 8 pgs.

"U.S. Appl. No. 14/584,750, Response filed Feb. 29, 2015 to Non Final Office Action mailed Aug. 28, 2015", 16 pgs.

"U.S. Appl. No. 14/584,850, Final Office Action mailed Sep. 1, 2017", 31 pgs.

"U.S. Appl. No. 14/584,850, Non Final Office Action mailed Jan. 10, 2017", 9 pgs.

"U.S. Appl. No. 14/584,850, Response filed Apr. 10, 2017 to Non Final Office Action mailed Jan. 10, 2017", 13 pgs.

"How to Asana: Inviting teammates to Asana." YouTube, Asana, Mar. 21, 2017, https://www.youtube.com/watch?v=TLOruY1KyxU (Year: 2017), 13 pages.

"Rules of Data Conversion from Document to Relational Databases", published: 2014, publisher: Future-processing, pp. 1-8 (Year: 2014).

(Tiburca, Andrew) Best Team Calendar Applications for 2018-Toggl https://toggl.com/blog/best-team-calendar-applications-for-2018 (Year: 2017) 3 pages.

Asana Demo and Product Tour, you tube excerpt, Dec. 7, 2017 https://www.youtube.com/watch?v=IMAFWVLGFyw (Year: 2017) (16 pages).

Asana integrations, Asana tutorial, youtube, excerpt, Nov. 16, 2016 https://www.youtube.com/watch?v=hBiQ7DJNinE (Year: 2016) (21 pages).

Asana Workload and Portfolios, youtube, excerpt, Aug. 1, 2019 https://www.youtube.com/watch?v=7XkNcfFDG6M (Year: 2019) (20 pages).

Asana YouTube channel, list of all product videos, Nov 19, 2014-Aug. 19, 2019 https://www.youtube.com/user/AsanaTeam/videos?disable_polymer=1 (Year: 2019) (5 pages).

Asana, Task dependencies, archives org, Aug. 25, 2017 https://web.archive.org/web/20170825002141/https://asana.com/guide/help/tasks/dependencies (Year: 2017) (5 pages).

Asana,Manage your team capacity with Workload, youtube, excerpt, Aug. 1, 2019 https://www.youtube.com/watch?v=2ufXyZDzZnA&list=PLJFG93oi0wJAi UwyOhIGWHdtJzJrzyIBv (Year: 2019) (1 page).

Assef, F., Cassius, T. S., & Maria, T. S. (2018). Confrontation between techniques of time measurement. Journal of Manufacturing Technology Management, 29(5), 789-810. (Year: 2018).

Biggs, "GateGuru Relaunches With New Ways to Streamline Your Travel Experience", Techcrunch, (Apr. 26, 2013), 3 pgs.

Castaneda Samuel, Introduction Manual—Asana, Sep. 25, 2017 https://static1.squarespace.com/static/586d532ae58c6232db243a65/t/5c210c10f950b7fc7a8e3274/1545669658049/Asana+Manual.pdf (Year: 2017) (20 pages).

Command and control, wikipedia, archives org, Mar. 16, 2018 https://web.archive.org/web/20180316193655/https://en.wikipedia.org/wiki/Command_and_control (Year: 2018), 6 pages.

(56) References Cited

OTHER PUBLICATIONS

Creating Tables with Fields from 2 Different Tables, published: 2009, publisher: StackOverflow, pp. 1-2. (Year: 2009).

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/ https://en.wikipedia.org/wiki/Critical_path_method (Year: 2017) 6 pages.

Dawei Li, "Deepcham: Collaborative Edge-Mediated Adaptive Deep Learning for Mobile Object Recognition", 2016, IEEE/ACM, pp. 64-76. (Year: 2016).

Fruhlinger, Joshua. "The Best To-Do ListApps for Feeling Productive; With the right app, feeling productive can be just as gratifying as actually getting things done" Wall Street Journal (Online); New York, N.Y. [New York, N. Y]Nov. 8, 2013 (Year: 2013) 4 pages.

Hartmann, "TimeProjectscheduling with resource capacities and requests varying with time: a case study," 2013, Flexible services and manufacturing journal, vol. 25, No. 1, pp. 74-93 (Year: 2013).

Helen Mongan-Rallis & Terrie Shannon, "Synchronous Chat," Aug. 2016, Dept. of Education, Univ. of MN Duluth, web. archive.org/web/20160825183503/https://www.d.umn.edu/hrallis/professional/presentations/cotfsp06/indiv_tools/sync_chat.htm (Year: 2016) (2 pages).

How to Asana Asana time tracking, youtube, excerpt, May 24, 2017 https://www.youtube.com/watch?v=z91qlex-TLc (Year: 2017) (1 page).

How to Asana, Asana project management, youtube, excerpt, Mar. 7, 2017 https://www.youtube.com/watch?v=qqANMTvVpE (Year: 2017) (28 pages).

How to Asana, Creating your first Asana project, youtube, excerpt, Jan. 31, 2017 https://www.youtube.com/watch?v=L04WmcUdsLo (Year: 2017) (1 page).

How to Asana, Getting Asana into your workflow, youtube, excerpt, Jul. 17, 2017 https://www.youtube.com/watch?v=7YLrNMdv3o (Year: 2017) (24 pages).

How to Asana, Planning with Asana calendar, youtube excerpt, Feb. 14, 2017 https://www.youtube.com/watch?v=w8t6KYiVPyc (Year: 2017) (19 pages).

How to Asana, Using Asana for task management, youtube, excerpt, Feb. 7, 2017 https://www.youtube.com/watch?v=vwvbgiejhQ (Year: 2017) (8 pages).

How to Asana, Visualizing work with Asana kanban boards, youtube, excerpt, Feb. 21, 2017 https://www.youtube.com/watch?v=jmZaZGydfPY (Year: 2017) (41 pages).

How to Asana, Workflow management, youtube, excerpt, May 30, 2017 https://www.youtube.com/watch?v=rk8nPWmXsRo (Year: 2017) (9 pages).

How to use Advanced Search in Asana, Asana tutorial, May 25, 2016 https://www.youtube.com/watch?v=5VyJ3toPfQM (Year: 2016) (28 pages).

Justin Rosenstein, Unveiling the Future of Asana, Mar. 28, 2018 https://www.youtube.com/watch?v=nRI?d_WM4Bc (Year: 2018) (2 pages).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Macro, computer science, wikipedia, archives org, 6 pages, Feb. 11, 2020 http://web.archive.org/web/20200211082902/https://en.wikipedia.org/wiki/Macro_(computer_science) (Year: 2020) 6 pages.

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018) (8 pages).

Paul Minors, How to automate your tasks, youtube excerpts, Oct. 18, 2019 https://www.youtube.com/watch?v=lwF9XyUQrzw (Year: 2019).

Prioritize My Tasks in Asana, Asana tutorial, youtube, excerpt, May 25, 2016 https://www.youtube.com/watch?v=UbCnMvw01nl (Year: 2016) (3 pages).

Project views, Asana tutorial, youtube, excerpt May 25, 2016 https://www.youtube.com/watch?v=FYjA8ZH3ceQ (Year: 2016) (5 pages).

Using Asana Premium, Asana tutorial, youtube, excerpt, Sep. 10, 2016 https://www.youtube.com/watch?v=vMgLtDDmyeo (Year: 2016) (4 pages).

Where does Asana fit in, archives org, Jul. 8, 2017 https://web.archive.org/web/20170708150928/https://asana.com/guide/resources/infosheets/where-does-asana-fit (Year: 2017) (5 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

www.asana.com (as retrieved from https://web.archive.Org/web/20160101054536/https://asana.com/press and https://web.archive.org/web/20160101054527/https://asana.com/product) (Year: 2016) 15 pages.

www.cogmotive.com/blog/author/alan Alan Byrne: "Creating a company Shared Calendar in Office 365"; pp. 1-17; Sep. 10, 2013 (16 pages).

D. Surian, N. Liu, D. Lo, H. Tong, E.-P. Lim and C. Faloutsos, "Recommending People in Developers' Collaboration Network," 2011 18th Working Conference on Reverse Engineering, Limerick, Ireland, 2011, pp. 379-388, doi: 10.1109/WCRE.2011.53 (Year: 2011).

Kroner, M. Schneider and J. Mori, "A Framework for Ubiquitous Content Sharing," in IEEE Pervasive Computing, vol. 8, No. 4, pp. 58-65, Oct.- Dec. 2009, doi: 10.1109/MPRV.2009.65 (Year: 2009).

\* cited by examiner ns SYSTEMS AND METHODS TO CUSTOMIZE
A USER INTERFACE OF A
COLLABORATION ENVIRONMENT BASED
ON RANKING OF WORK UNIT RECORDS
MANAGED BY THE COLLABORATION
ENVIRONMENT

FIELD OF THE DISCLOSURE

The present disclosure relates to monitoring online activity of users within a collaboration environment, ranking work unit records managed within the collaboration environment based on the user activity, and customizing a user interface based on the rankings.

BACKGROUND

Web-based collaboration environments, sometimes referred to as work management platforms, may enable users to assign projects, tasks, and/or other work assignments to assignees (e.g., other users) to complete. A collaboration environment may comprise an environment in which individual users and/or a virtual team of users does its work and enables the users to work in a more organized and efficient manner when remotely located from each other.

SUMMARY

Hosting a web-based collaboration environment poses many challenges. For example, operating the collaboration environment may require precise ways of creation, storage, management, and/or provision of information that makes up the collaboration environment. A way that operators look to improve the operation of the collaboration environment is to improve user interfaces. Improvements may be directed to utilizing techniques unique to computers (e.g., machine learning) to generate insights about the users and/or the work being managed within the collaboration environment. These insights may drive unique improvements and customizations to user interfaces. In particular, user interface improvements may be related to rendering views that provide quicker access to certain pages for records for work. Traditionally, users navigate through a user interface of the collaboration environment in order to track down records of interest, including looking for specific records by performing detailed navigation, and causing the user interface to present pages for those records in order to view and access the content of the records. However, many users find this time consuming due to the need to scroll around, and switch views many times to find the right record page. This amount of navigation, in turn, requires additional resources (e.g., bandwidth, memory) by the server hosting the collaboration environment and serving the user interfaces to client devices of the users.

To address these and/or other problems, one or more implementations presented herein propose a technique to customize a user interface of a collaboration environment based on ranking of work unit records managed by the collaboration environment. The user interface may be customized to display a record summary (such as a list) of high-ranked records for work, where particular user interface elements in the summary are selectable by a user to launch respective pages, much faster than conventional navigation approaches. The speed of a user's navigation through various views and pages of the collaboration environment are improved because it saves the user from navigating through multiple sets of record pages that may be nested or sorted within different hierarchies of records, opening up a page, and then navigating within that page to enable content of interest to be seen.

Ranking records of work and customizing a user interface based on the rankings provides a way for users to quickly access work being managed in the collaboration environment without having to navigate fully through the online environment to locate and launch record-specific pages. Based on interactions of individual ones of the users with individual ones of the records within the virtual collaboration environment, the system may be configured to generate rankings of the work unit records. These rankings may provide the basis for customizing a section, pane, or window of a user interface of the collaboration environment to include user interface element corresponding to relatively highest-ranked work.

One or more implementations presented herein may leverage computer-based modeling techniques including, but not limited to, machine learning models. By way of non-limiting illustration, one or more machine learning models may be specially trained based on user interactions to determine likelihoods that individual users will revisit work unit records. In particular, the model may take into account interactions by users individually (e.g., user-level interactions) as well as by groups of users (e.g., domain-level interactions). The inventors of the present disclosure have discovered that utilizing a combination of user-level interactions and domain-level interactions in the training and implementation of a machine learning model provides improved accuracy in the determinations of likelihoods that individual users will revisit work unit records, thus producing record summaries of highly ranked records that lead to visits of their respective pages.

In some implementations, a model may comprise a classifier model. A machine learning model may carry out processing steps and perform functionality that a human could not practically do, and/or in ways that may be unintuitive to humans.

These, along with other features and/or functionality presented herein, may be recognized by persons of ordinary skill in the art as providing improvements upon the operation of a collaboration environment including, among others, increased efficiency and accuracy in the creation and management of records and/or the information making up the records of the collaboration environment, and/or improvements in the user interfaces and navigation through the user interfaces of collaboration environments. Further, persons of ordinary skill in the art will recognize that feature(s) and/or functionality described herein is necessarily rooted in computer technology at least because of one or more computer-based modeling approaches described herein, and/or because the collaboration environment itself is necessarily rooted in modern Internet technologies including, among other, the ability to identify and track remote-user activity within web-based platforms to derive information about user interactions.

One or more implementations of a system configured to customize a user interface of a collaboration environment based on ranking of work unit records managed by the collaboration environment may include one or more of non-transitory electronic storage, one or more hardware processors configured by machine-readable instructions, and/or other components. Executing the machine-readable instructions may cause the one or more hardware processors to facilitate generating record recommendations for users of collaboration environment. The machine-readable instructions may include one or more computer program components. The one or more computer program components may include one or more of an environment state component, a user interface component, a ranking component, and/or other components.

The environment state component may be configured to manage environment state information maintaining a collaboration environment. The collaboration environment may be configured to facilitate interaction by users with the collaboration environment and/or each other. The environment state information may include one or more records. The records may include work unit records. The work unit records may describe units of work managed, created, and/or assigned within the collaboration environment.

The environment state component may be configured to determine user-level record interaction information and/or other information. The user-level record interaction information may include user-level interaction values for a user-level interaction attribute and/or other information. The user-level interaction attribute may characterize interactions of individual ones of the users with individual ones of the work unit records. An individual user-level interaction value may correspond to an individual one of the work unit records and an individual one of the users. By way of non-limiting illustration, the user-level record interaction information may include one or more of a first user-level interaction value corresponding to a first user and a first work unit record, a second user-level interaction value corresponding to a second user and the first work unit record, and/or other user-level interaction values.

The environment state component may be configured to determine domain-level record interaction information and/or other information. The domain-level record interaction information may include domain-level interaction values for a domain-level interaction attribute. The domain-level interaction attribute may characterize interactions of a set of the users with the individual ones of the work unit records. The first user may be included in the set of users. An individual domain-level interaction value may correspond to an individual one of the work unit records and the set of the users, such that the individual domain-level interaction value makes no reference to any particular user. By way of non-limiting illustration, the domain-level record interaction information may include a first domain-level interaction value corresponding to the first work unit record and the set of the users, and/or other information.

The ranking component may be configured to generate, for individual ones of the users, rankings of work unit records based on one or more of the user-level record interaction information, the domain-level record interaction information, and/or other information. By way of non-limiting illustration, the first work unit record may be ranked within a first ranking generated for the first user based on one or more of the first user-level interaction value, the first domain-level interaction value, and/or other information. By way of non-limiting illustration, the first work unit record may be ranked within a second ranking generated for the second user based on one or more of the second user-level interaction value, the first domain-level interaction value, and/or other information.

The user interface component may be configured to effectuate presentation of instances of a user interface of the collaboration environment through which the users access work unit record. The instances of the user interface may be customized for individual users based on the rankings for the individual users and/or other information. In some implementations, a portion of the user interface may be configured to display work unit records having relatively highest ranks for a given user. The portion may display the work unit records by one or more of a list, a chart, a graph, and/or other presentation techniques. By way of non-limiting illustration, a first instance of the user interface may be customized for the first user based on the first ranking and/or other information. The first instance may be customized by displaying a first set of user interface elements corresponding to a first set of work unit records having the relatively highest ranks within the first ranking. By way of non-limiting illustration, a second instance of the user interface may be customized for the second user based on the second ranking and/or other information. The second instance may be customized by displaying a second set of user interface elements corresponding to a second set of work unit records having the relatively highest ranks within the second ranking.

As used herein, any association (or relation, or reflection, or indication, or correspondence) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
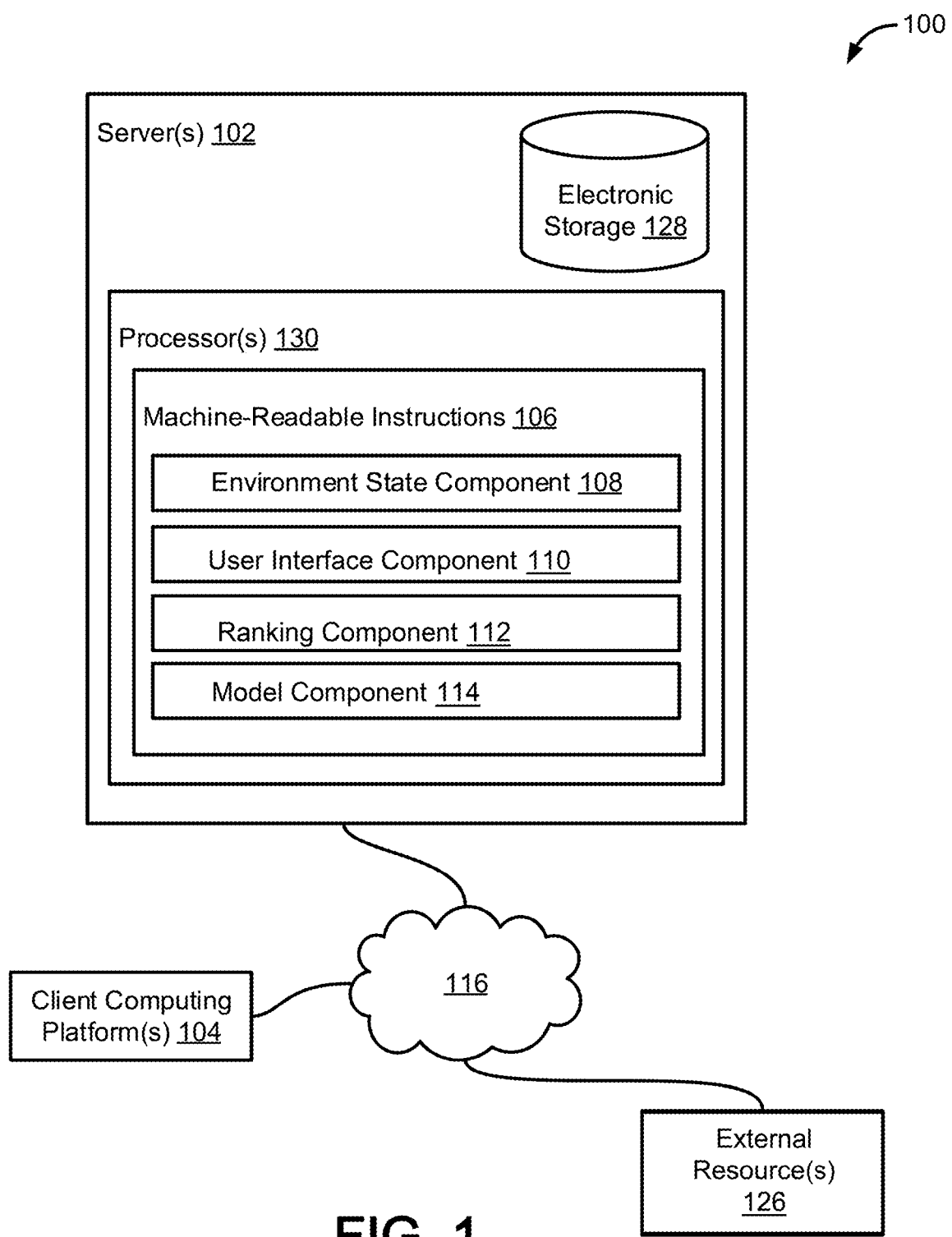
FIG. 1 illustrates a system configured to customize a user interface of a collaboration environment based on ranking of work unit records managed by the collaboration environment, in accordance with one or more implementations.

FIG. 1 illustrates a system 100 configured to customize a user interface of a collaboration environment based on ranking of work unit records managed by the collaboration environment, in accordance with one or more implementations. Some users may find that substantial navigation through views and/or pages of a user interface of a collaboration environment is required to locate and/or access records for work and launch their respective pages. This can make users feel like they do not have full context of everything going on at their organization, and can hinder collaboration. Ranking of records based on user interactions may provide a way to generate records summaries where users can easily find, and access, work being managed in the collaboration environment. One or more implementations presented herein may leverage one or more specially trained machine learning models.

In some implementations, system 100 may include one or more of one or more servers 102, one or more client computing platforms 104, external resource(s) 126, and/or other components. Server(s) 102 may be configured to communicate with one or more client computing platforms 104, one or more external resources 126, and/or other entities of system 100 according to a client/server architecture and/or other architectures. Client computing platform(s) 104 may be configured to communicate with other client computing platforms via server(s) 102 and/or according to a peer-to-peer architecture and/or other architectures. Users may access system 100 and/or instances of the collaboration environment via client computing platform(s) 104. Server(s) 102 may be remote from client computing platform(s) 104. Client computing platform(s) 104 may be remote from each other.

Server(s) 102 may include one or more of non-transitory electronic storage 128, one or more processors 130 configured by machine-readable instructions 106, and/or other components. The non-transitory electronic storage 128 may store one or more records and/or other information. Machine-readable instructions 106 may include one or more instruction components. The instruction components may include computer program components. Executing the machine-readable instructions 106 may cause server(s) 102 to facilitate generating record recommendations for users of collaboration environment. The computer program components may include one or more of an environment state component 108, a user interface component 110, a ranking component 112, a model component 114, and/or other components.

Environment state component 108 may be configured to manage environment state information and/or other information used in maintaining a collaboration environment (e.g., information stored in storage 128 and/or other storage locations). The collaboration environment may be configured to facilitate interaction by users with the collaboration environment. The environment state information may include one or more records. The one or more records may include one or more of user records, work unit records, and/or other records. The user records may include user information describing the users of the collaboration environment. The work unit records may include work unit information describing units of work assigned to, created by, and/or managed by the users within the collaboration environment.

The user information in the user records may include values of user parameters and/or other information. The values of the user parameters may be organized in the user records corresponding to users interacting with and/or viewing the collaboration environment. The values of the user parameters may include information describing and/or identifying the users, their actions within the collaboration environment, their settings, metadata associated with the users, work they are members of and/or collaborate on, and/or other user information. Individual ones of the users may be associated with individual ones of the user records. A user record may define values of the user parameters associated with a given user.

The values of the user parameters may, by way of non-limiting example, specify one or more of: a user name, a group, a user account, user role information, a user department, descriptive user content, a to-email, a from-email, a photo, an organization, a workspace, one or more user comments, one or more teams the user belongs to, one or more of the user display settings (e.g., colors, size, project order, task order, other unit of work order, etc.), work inclusion information (e.g., identification of work unit records they are members of and/or collaborate on), one or more authorized applications, one or more interaction parameters (e.g., indicating a user is working on/worked on a given unit of work, a given user viewed a given work unit of work, a given user selected a given unit of work, a timeframe a given user last interacted with and/or worked on a given unit of work, a time period that a given unit of work has been idle, and/or other interaction parameters), one or more notification settings, one or more progress parameters, status information for one or more work units the user is associated with (e.g., units of work assigned to the user, assigned to other users by the user, completed by the user, past-due date, and/or other information), one or more performance/productivity metrics of a given user (e.g., how many units of work the user has completed, how quickly the user completed the units of work, how quickly the user completes certain types of work units, the efficiency of the user, bandwidth of the user, activity level of the user, how many business objectives the user has helped fulfill through their completion of units of work, etc.), application access information (e.g., username/password for one or more third-party applications), one or more favorites and/or priorities, schedule information, and/or other information.

Schedule information for the individual users may include one or more calendar entries associated with the individual users. The individual calendar entries may be associated with individual start dates and individual end dates. In some implementations, schedule information may be stored locally within electronic storage 128 by virtue of features and/or functionality provided within a collaboration environment. By way of non-limiting illustration, a collaboration environment may have features and/or functionality of a calendar application configured to facilitate calendaring entries into a schedule. It is noted that schedule information may be determined through features and/or functionality provided by one or more external resources 126. By way of non-limiting illustration, external resources may include a calendar application which may be external to a collaboration environment. The collaboration environment may have permissions to access the external calendar application to determine and/or obtain schedule information.

Work inclusion information may include identification(s) of work unit records that individual users are members of and/or collaborate with one or more other users on.

Collaboration between users may include performing shared and/or cooperative actions within the collaboration environment to complete and/or advance one or more of the units of work. The shared and/or cooperative actions may include one or more of communication actions, work completion actions, and/or other actions. One or more implementations of the present disclosure may be configured to leverage the fact that users may be interacting with the collaboration environment and/or each other in synchronous and/or asynchronous ways using remotely located client computing platforms. For example, a user may log into the collaboration environment and perform one or more actions and then sign out. The user may log in at a later date and notice that the collaboration environment has changed due to changes that were made by one or more other users while they were signed out. Accordingly, collaboration between users may have been occurring without any direct knowledge of other user's actions within the collaboration environment. At least some of the collaboration between users may be non-intuitive and/or not immediately knowable. Instead, one or more implementations described herein may take advantage of the existence of the work unit records that are stored and maintained by server(s) 102 which store and track user actions. From these records, collaboration may then be derived and/or determined in ways that would otherwise not be possible by the users individually and/or together.

Communication actions may include communicating within and/or outside the collaboration environment about a unit of work in an effort to advance progress toward completion of the unit of work and/or other units of work associated with the unit of work. Communicating within the collaboration environment may include one or more of adding comments to a comment thread, messaging via chat interfaces of the collaboration environment, adding comments as metadata to digital content items that are associated with a unit of work, "@" mentioning one or more users, and/or other actions. Communicating outside the collaboration environment may include one or more of communication through e-mail, generating calendar items that relate to completion of a unit of work, conducting meetings (in person and/or virtual), messaging via chat interfaces that are external to the collaboration environment, and/or other actions.

Work completion actions may include actions performed within the collaboration environment that are related to advancing progress of one or more work unit records for one or more units of work. The actions may include one or more of creating work unit records, assigning work unit records, marking units of work as complete, adding due dates to units of work, and/or other actions.

The "members" of the work unit records may include specifically-named users within the work unit records. Specifically naming users may be accomplished by linking user records for those users to the work unit records. Linking the user records to the work unit records may comprise including a referential notation of the user records in the work unit records. Linking the user records to the work unit records may comprise including copies or instances of the user records in the work unit records. In some implementations, users having a particular status with respect to a work unit record may be considered members. By way of non-limiting illustration, users who are designated to perform one or more actions to facilitate completion of the units of work (e.g., assignees, assignors, creators, managers, collaborators, and/or other users) may be considered members. In some implementations, "member" status may be a status that is separate and distinct from users who are actively performing one or more actions to facilitate completion of the units of work. In some implementations, "member" may refer to users who view, access, monitor, and/or otherwise engage with units of work in ways that may not directly facilitate completion of the units of work.

The work unit information in the work unit records may include values of one or more work unit parameters and/or other information. The values of the work unit parameters may be organized in work unit records corresponding to units of work managed, created, and/or assigned within the collaboration environment. A given unit of work may have one or more assignees, owners, and/or collaborators working on the given work unit. Units of work may include one or more of tasks, projects, objectives, portfolios, and/or other units of work.

Work unit records may be created by a given user for the given user and/or created by the given user and assigned to one or more other users. Work unit records may be created by a given user for the given user and/or created by the given user and managed by one or more other users. Tasks may include to-do items and/or action items one or more users should accomplish and/or plan on accomplishing in order to complete a task. Individual work unit records may include and/or may be associated with one or more digital content items. An individual work unit records may include an individual digital content item by virtue of the individual digital content item (and/or a copy or instance thereof) being attached and/or appended thereto. A digital content item may include one or more of an image, a video, an audio file, a PDF, a word document, and/or other digital content items.

In some implementations, work unit records created by, assigned to, and/or completed by the users may refer generally to a linking of the work unit records with the individual users in the collaboration environment. A work unit record may be linked with a user in a manner that defines one or more relationships between the user and the underlying unit of work. Such a relationship may connote and/or be a result of an action (past, present, and/or future) of the user with respect to the work unit record. Such actions may include one or more of creating a work unit record for a unit of work, being assigned to participate in a unit of work, participating in a unit of work, being granted access to a work unit record of a unit of work, adjusting a value of a work unit parameter of a work unit record of a unit of work, being assigned a role at the unit of work level, and/or other actions.

Individual sets of work unit records may be defined by a record hierarchy. A record hierarchy may convey individual positions of work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access (or restricted from marking complete) by one or more users unless and/or until a subordinate work unit record is completed and/or started.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

In some implementations, the hierarchical information may specify that individual records are concurrently subordinate to more than one other record in more than one hierarchy. This may be referred to as "multi-homing" of a record. By way of non-limiting illustration, a record may be subordinate to two other records within two different hierarchies. Stated otherwise, the record may be considered "multi-homed" with respect to the two other records. In the case of multi-homing, presence of a multi-homed record in multiple other superior records may be established through separate instances of the same multi-homed record in each of the other superior records. The multi-homed record thus may be accessed through either of the pages of the superior records.

In some implementations, values of work unit parameters may specify one or more of a unit of work name, a unit of work description, user role information, one or more unit of work dates (e.g., a start date, a due date or end date, a completion date, and/or dates), project inclusion (e.g., identification of projects supported by the individual units of work), objective inclusion (e.g., identification of objectives supported by the individual units of work), one or more members associated with a unit of work (e.g., an owner, one or more collaborators, collaborator access information, and/or other unit of work collaborators and/or collaborator information), completion state, one or more user comment parameters (e.g., permission for who may make comments such as an assignee, an assignor, a recipient, one or more followers, and/or one or more other interested parties; content of the comments; one or more times; presence or absence of the functionality of up-votes; one or more hard-coded responses; and/or other parameters), one or more interaction parameters (e.g., indicating a given unit of work is being worked on/was worked on, a given work unit of work was viewed, a given unit of work was selected, how long the given unit of work has been idle, a last interaction parameter indicating when and what user last interacted with the given unit of work, users that interacted with the given unit of work, quantity and/or content of comments on the unit of work, and/or other interaction parameters indicating sources of the interactions, context of the interactions, content of the interactions and/or time for the interactions), one or more digital content item attachments, notification settings, privacy, an associated URL, one or more interaction parameters (e.g., sources of the interactions, context of the interactions, content of the interactions, time for the interactions, and/or other interaction parameters), updates, state of a workspace for a given unit of work (e.g., application state parameters, application status, application interactions, user information, and/or other parameters related to the state of the workspace for a unit of work), one or more performance/productivity metrics for a given unit of work, hierarchical information, dependency information, one or more custom fields (e.g., priority, cost, stage, and/or other custom fields), and/or other information.

In some implementations, work unit parameters may include one or more of a work assignment parameter, a work completion parameter, a work management parameter, a work creation parameter, a dependency parameter, a grouping parameter, and/or other parameters. The values of the work assignment parameter may describe assignees of individual units of work. The values of the work management parameter may describe users who manage individual units of work and/or the extent in which they manage. The values of the work creation parameter may describe creation characteristics of individual units of work. The creation characteristics may include who created the work unit record, when it was created, and/or other information.

In some implementations, values of a dependency parameter may describe whether a given unit of work is dependent on one or more other units of work. A unit of work being dependent on an other unit of work may mean the unit of work may not be completed, started, assigned, and/or have other interactions performed in relation to the unit of work before some action is performed on the other unit of work. By way of non-limiting illustration, a unit of work may not be started until another unit of work is completed, meaning the unit of work may be dependent on the other unit of work. In some implementations, values of the dependency parameter may go hand in hand with the hierarchical information. By way of non-limiting illustration, a unit of work that is subordinate to an other unit of work may be dependent on the other unit of work, or vice versa.

The values of the work assignment parameter describing assignment of users to work unit records may be determined based on one or more interactions by one or more users with a collaboration environment. In some implementations, one or more users may create and/or assign one or more work unit records to themselves and/or another user. In some implementations, a user may be assigned a work unit record, and the user may effectuate a reassignment of the work unit record.

In some implementations, values of the work completion parameter may indicate that a completion status of a unit of work has changed from "incomplete" to "marked complete" and/or "complete." In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, a completion status may include one or more of "rejected," "revisions required," "incomplete," and/or other statuses. By way of non-limiting illustration, for units of work that require one user to review work by another user, additional user interface elements may be presented where users can set the status as one or more of "marked complete," "incomplete," "rejected," "revisions required," and/or other statuses. In some implementations, a status of rejected for a unit of work may be associated with the passing of an end date associated with the unit of work without the work having been marked complete manually. In some implementations, a status of rejected for a unit of work may be associated with a user specifying the unit of work as rejected. In some implementations, a status of revisions required for a unit of work may be associated with a user specifying that the work being reviewed requires changes, but is otherwise approved. In some implementations, a status of revisions required may present the reviewing user with options to specify what revisions are required. In some implementations, a status of revisions required may cause a follow up unit of work to be generated which is assigned back to the assignor of the original work.

In some implementations, values of a grouping parameter may describe whether a given unit of work supports a project, portfolio, and/or objective. The values may specify one or more of a name/title of another work unit record (e.g., project, objective), a name/username of an owner of another work unit record, and/or other information.

In some implementations, managing the environment state component 108 may include maintaining queues of the units of work assigned to the users. The queues may be presented to the users in a user interface of the collaboration environment to facilitate access to the units of work via work unit pages. Individual queues may represent the units of work assigned to individual users organized in an order based on the individual end dates and/or other dates (e.g., start dates) and/or other ordering. Individual queues may be presented in a user interface based on one or more spatial arrangements. The particular spatial arrangement used by a user may be stored as part of a user record for the user. The spatial arrangements may include one or more of a list view, a calendar view, a board view, and/or other views. The list view may include a vertical arrangement of graphic icons representing work unit records. The calendar view may be a calendar view by week, by more than one week (e.g., $1^{st}$ through $15^{th}$), by month, by more than one month (e.g., May through July), and/or other calendar views. Units of work may be represented in a calendar view by user interface elements (e.g., icons, calendar entries, etc.). The board view may include a grid of cells comprising columns and rows, where visual content item (e.g., icons) representing work unit records may be positioned in the cells. Columns may be associated with sections (e.g., different hierarchies, groupings, etc.), and the cells within the column may be populated with visual content item representing work unit records that are associated with the sections.

In some implementations, environment state component 108 may be configured to manage information defining work unit pages (sometimes referred to simply as "pages") corresponding to the individual work unit records. Individual work unit pages may provide access to individual work unit records. Managing information may include one or more of determining, obtaining, receiving, requesting, checking, storing, modifying, and/or other operations. Managing information defining individual work unit pages may include providing information to the user interface component 110 to effectuate presentation of the work unit pages, and/or other information. In some implementations, individual work unit pages may include individual sets of interface elements displaying the values of one or more of the work unit parameters of the individual work unit records.

Users may access work unit records via the work unit pages by viewing, adding, changing, deleting, and/or otherwise interacting with values of work unit parameters stored by the work unit records. In some implementations, work unit pages providing access to tasks may be referred to as task pages; work unit pages providing access to projects may be referred to as project pages; and work unit pages providing access to objectives may be referred to as objective pages. In some implementations, user pages may include views of the collaboration environment that provide access to user records.

In some implementations, work unit records may define tasks. The work unit records defining tasks may be referred to as "task records." The work unit information that defines tasks may be referred to as "task information" and/or other information. Task information may include values of work unit parameters for tasks managed within the collaboration environment. The work unit parameters for tasks may be referred to as "task parameters." The work unit parameters comprising task parameters may be specific to tasks and/or may include one or more parameters not shared with projects, objectives, and/or other records. The task parameters may characterize one or more tasks created, assigned, and/or managed within the collaboration environment and/or via the collaboration environment, and/or the metadata associated with the one or more tasks.

In some implementations, work unit records may define projects. The work unit records defining projects may be referred to as "project records." The work unit information that defines projects may be referred to as project information and/or other information. Project information may include values of work unit parameters for projects managed within the collaboration environment. The work unit parameters for projects may be referred to as "project parameters."

The work unit parameters comprising project parameters may be specific to projects and may include one or more parameters not shared with tasks, objectives, and/or other records. The project parameters may characterize one or more projects created, owned, assigned, and/or managed within the collaboration environment and/or via the collaboration environment, and/or the metadata associated with the one or more projects. Individual ones of the projects may be associated with individual ones of the records. A given project may have one or more owners and/or one or more collaborators working on the given project. The given project may be associated with one or more other units of work assigned to one or more users under the given project heading. In some implementations, projects may include one or more units of work that may directly facilitate progress toward fulfillment of the projects. Accordingly, completion of units of work may directly contribute to progress toward fulfillment of the project. By way of non-limiting illustration, an individual project may be associated with a client, and the units of work under the individual project heading may be work directly contributing to the fulfillment of a business relationship with the client.

The values of the project parameters may, by way of non-limiting example, include one or more of: one or more units of work associated with individual ones of the projects (which may include values of other work unit parameters defined by one or more work unit records), status information, user role information, one or more user comment parameters (e.g., a creator, a recipient, one or more followers, one or more other interested parties, content, one or more times, upvotes, other hard-coded responses, etc.), a project name, a project description, one or more project dates (e.g., a start date, a due date, a completion date, and/or other project dates), one or more project collaborators (e.g., an owner, one or more other project collaborators, collaborator access information, and/or other project collaborators and/or collaborator information), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, and/or other information.

In some implementations, work unit records may define objectives. The work unit records defining objectives may be referred to as "objective records." The work unit information defining objectives may be referred to as "objective information." The objective information may include values of one or more work unit parameters that define the objectives. The values of the work unit parameters may be organized in records corresponding to objectives (sometimes referred to as "business objectives") managed, created, and/or owned within the collaboration environment. The work unit parameters corresponding to objectives may be referred to as "objective parameters." The work unit parameters comprising objective parameters may be specific to objectives and may include one or more parameters not shared with tasks and/or projects. A given objective may have one or more collaborators, and/or team members working on the given objective. Objectives may be associated with one or more units of work one or more users should accomplish and/or plan on accomplishing. Objectives may be created by a given user for the given user and/or created by the given user and assigned to be owned to one or more other users. Individual objectives may include one or more of an individual goal, an individual sub-goal, and/or other business objectives assigned to be owned by a user and/or associated with one or more users.

The objectives may be associated with a set of units of work that may indirectly facilitate progress toward fulfillment of the objectives. The set of units of work may not directly contribute to the progress. By way of non-limiting illustration, a connection between the set of units of work and a corresponding objective may be indirect in that completion of at least one of the units of work may have no direct impact on progress toward fulfillment of the objective. The concept of "no direct impact" may mean that completion of the at least one unit of work may not cause progress toward fulfillment of the business objective without independent action outside of the at least one unit of work and/or project. Instead, the fulfillment of the at least one unit of work may make such independent action more likely (e.g., through coercion, assistance, education, incentivization, reminder, etc.). However, in some implementations, objectives may be associated with one or more units of work that may directly facilitate progress toward fulfillment of the objectives. Accordingly, completion of the set of units of work may directly contribute to the progress toward fulfillment. Objectives may be associated with an objectives and key result (OKR) goal-setting framework. Objectives may be specified on one or more of a team basis, organization basis, and/or other specifications. In some implementations, objectives may be characterized as user objectives. User objectives may be specified on an individual user basis. A user objective may be associated with a set of units of work assigned to a user that may indirectly (and/or directly) facilitate progress toward fulfillment of the user objective.

In some implementations, objectives may be described based on one or more of a business objective name, a business objective description, one or more business objective dates (e.g., a start date, a due date, and/or dates), one or more members associated with a business objective (e.g., an owner, one or more other project/task members, member access information, and/or other business objective members and/or member information), progress information (e.g., an update, a hardcoded status update, a measured status, a progress indicator, quantity value remaining for a given business objective, completed work units in a given project, and/or other progress information), one or more interaction parameters, notification settings, privacy, an associated URL, one or more custom fields (e.g., priority, cost, stage, and/or other custom fields), and/or other information.

The values of the objective owner parameter describing objectives owned by the individual users may be determined based on one or more interactions by one or more users with a collaboration environment. In some implementations, one or more users may create and/or assign ownership of one or more objectives to themselves and/or another user. In some implementations, a user may be assigned to own an objective and the user may effectuate a reassignment of ownership of the objective from the user or one or more other users.

Progress information for the individual objectives may convey progress toward fulfillment of the individual objectives. In some implementations, the progress toward fulfillment of the business objectives may be specified as one or more of a quantitative value, a qualitative value, and/or other information. In some implementations, the quantitative value may be a percentage of completion, an integer value, a dollar amount, and/or other values. In some implementations, progress toward fulfillment of the individual objectives may be determined independently from incremental completion of the units of work associated with the individual objectives. The completion of the units of work associated with a given objective may not directly progress the given business objective toward fulfillment, but completing the units of work may make accomplishing the business objective more likely (e.g., through coercion, assistance, education, incentivization, reminder, etc.). However, in some implementations, progress toward fulfillment of the individual business objectives may be directly determined based on incremental completion of the units of work in the individual sets of units of work associated with the individual business objectives.

User role information may specify one or more roles of individual users. A role may represent a position of an individual user. A role may represent one or more of how a user works, how a user is expected to work, how a user intends to work, and/or other considerations. The position may be specified based on a description of one or more of a job title, level, and/or other descriptions of position. A role may be specified with respect to a business organization as a whole and/or other specifications. By way of non-limiting illustration, a role may include one or more of the following: chief executive officer (or other officer), owner, manager, supervisor, accountant, associate, employee, intern, entry level, midlevel, senior, administrator, director, foreman, engineer, product developer, human resource officer, artist, art director, and/or other descriptions.

In some implementations, user role information may specify roles of the users within work unit records. A role may convey expected contribution of a user in completing and/or supporting a unit of work. By way of non-limiting illustration, a role within a work unit record may include one or more of owner, manager, creator, reviewer, approver, final decision maker, assignee, assignor, helper, liaison, and/or other descriptions. The individual roles of individual users within some units of work (e.g., a task) may be specified separately from the individual roles of the individual users within other units of work (e.g., a project associated with the task). The individual roles of individual users within the work unit records may be specified separately from the individual roles of the individual users within a business organization as a whole. For example, a business owner may have an "owner" role with respect to a business organization as a whole, while having a "reviewer" role within a project.

In some implementations, work unit records may define portfolios. The work unit records defining portfolios may be referred to as "portfolio records." The work unit information that defines portfolios may be referred to as portfolio information and/or other information. Portfolio information may include values of work unit parameters for portfolios managed within the collaboration environment. The work unit parameters for portfolios may be referred to as "portfolio parameters." The work unit parameters comprising portfolio parameters may be specific to portfolios and may include one or more parameters not shared with tasks, objectives, project, and/or other records. The portfolio parameters may characterize one or more portfolios created, owned, assigned, and/or managed within the collaboration environment and/or via the collaboration environment, and/or the metadata associated with the one or more portfolios. Individual ones of the portfolios may be associated with individual ones of the records. A given portfolio may have one or more owners and/or one or more collaborators working on the given portfolio. The given portfolio may be associated with one or more other units of work assigned to one or more users under the given portfolio heading. In some implementations, portfolios may include one or more units of work that may directly facilitate progress toward fulfillment of the portfolios. Accordingly, completion of units of work may directly contribute to progress toward fulfillment of the portfolio.

The values of the portfolio parameters may, by way of non-limiting example, include and/or specify one or more of: information about one or more projects within a given portfolio (which may include values of project parameters defined by one or more project records), information about one or more other portfolios within a given portfolio (which may include values of portfolio parameters defined by one or more other portfolio records), a portfolio name, a portfolio description, a status and/or progress (e.g., an update, a hardcoded status update, a measured status, quantity of units of work remaining in a given project, completed units of work in a given project, and/or other status parameter), one or more attachments, notification settings, privacy settings, an associated URL, one or more interaction parameters (e.g., sources of the interactions, context of the interactions, content of the interactions, time for the interactions, and/or other interaction parameters), updates, ordering of projects within the given portfolio, hierarchical information, permissions information, state of a workspace for a given project within the given portfolio, metadata associated with the portfolios, custom fields (e.g., values created by users), and/or other information.

In some implementations, environment state information may be continually monitored and/or updated as users interact with the collaboration environment over time. The environment state component 108 may store and/or archive the environment state information continuously, periodically, and/or based on user request to archive. The stored and/or archived environment state information may be referred to as historical environment state information and/or other information.

The environment state component 108 may be configured to determine interaction information for users, and/or other information. The interaction information may include interaction values for an interaction attribute and/or other information. The interaction attribute may characterize interactions of individual ones of the users with individual ones of the work unit records. An individual interaction value may correspond to an individual one of the work unit records and an individual one of the users. In some implementations, interactions with individual work unit records may be facilitated through work unit pages of the individual work unit records presented within a user interface of a collaboration environment.

The environment state component 108 may be configured to generate interaction information from the environment state information and/or other information. The environment state component 108 may generate interaction information based on monitoring change in environment state information as users interact with the collaboration environment over time. That is, as users interact with the collaboration environment remotely via client computing platform(s) 104, the environment state information may be updated to reflect such interactions. In some implementations, environment state component 108 may monitor users individually as the users interact with the collaboration environment over time to determine the impact of the users' interactions on the environment state information. In some implementations, environment state component 108 may monitor a domain or group of users collectively to determine the impact of a group's interactions on the environment state information.

Interaction information may include one or more of user-level record interaction information, domain-level record interaction information, and/or other information.

The user-level record interaction information may include user-level interaction values for a user-level interaction attribute and/or other information. The user-level interaction attribute may characterize interactions of individual ones of the users with individual ones of the work unit records. An individual user-level interaction value may correspond to an individual one of the work unit records and an individual one of the users. In some implementations, the user-level record interaction information may disregard, for the individual users, the work unit records that the individual users have yet to interact with (e.g., interaction values are zero or null). By way of non-limiting illustration, the user-level record interaction information may include one or more of a first user-level interaction value corresponding to a first user and a first work unit record, a second user-level interaction value corresponding to a second user and the first work unit record, and/or other user-level interaction values.

The domain-level record interaction information may include domain-level interaction values for a domain-level interaction attribute. The domain-level interaction attribute may characterize interactions of a set (or group) of users with the individual ones of the work unit records. An individual domain-level interaction value may correspond to an individual one of the work unit records and the set of the users. An individual domain-level interaction value may make no reference to any particular user in the set (but instead may be focused on the domain as a whole). By way of non-limiting illustration, the domain-level record interaction information may include a first domain-level interaction value corresponding to the first work unit record and the set of the users, and/or other information.

In some implementations, values may be expressed quantitatively, qualitatively, and/or other in other ways. In some implementations, quantitative expression may include one or more of quantity or amount, frequency, and/or other expressly. A quantity may comprise an integer value and/or other expressions. Frequency may be measured as an amount over a particular period of time or in a given sample. In some implementations, the particular period of time may include one or more of all time, a predetermined time window, and/or other measures. A predetermined time window may be relative to an event, e.g., a given window of time immediately prior to ranking work unit records, a window of time following some event (e.g., start of employment, start of moving to a new team, etc.), and/or other information. A predetermined time window may be relative to a time measure, e.g., this year, last year, this quarter, the first quarter of this year, the first half of this year, the last quarter of this year, the first two weeks following employment, etc. In some implementations, a predetermined time window may be specified by a user (e.g., from Aug. 29, 2021 to Jan. 16, 2022).

In some implementations, interactions characterized by the user-level interaction attribute are classified by interaction types. The interaction types may include one or more of a visitation type, a work completion type, a collaboration type, and/or other types.

Interactions of the visitation type may include visitations to pages of individual records. Visitation may include one or more of selecting to view a page of a record, viewing a page of a record, navigating to a page of a record (from another page and/or from a resource outside the collaboration environment, such as email or instant messages), viewing a page of a record for a given period of time, upvoting a record (e.g., selecting a "favorite" or "like" button), and/or other actions. In some implementations, the user-level interaction values of the visitation type may convey one or more of quantity of visitations, frequency of visitations, visitation return rate, and/or other information. By way of non-limiting illustration, the user-level interaction values of the visitation type may convey quantity of visitations to the individual ones of the work unit records over one or more periods of time.

Interactions of the work completion type may include work completion and/or advancement activities. Work completion and/or advancement activities may include one or more of completing supporting work (e.g., subordinate unit of work supporting fulfilment of a superior unit of work), assigning supporting units of work, setting due dates for units of work, and/or other actions. In some implementations, the user-level interaction values of the work completion type may convey one or more of quantity of completed supporting work, quantity of supporting work with due dates, quantity of supporting work currently assigned, and/or other information.

Interactions of the collaboration type may include collaborative actions. Collaborative actions may include one or more of becoming a member, sharing work unit records inside and/or outside the collaboration environment, and/or other actions. In some implementations, the user-level interaction values of the collaboration type convey length of membership to the individual ones of the work unit records, and/or other information.

In some implementations, user-level interaction value for individual users with respect to individual work unit records may be generated by aggregating individual sets of values for the individual work unit records. For example, for a given user and work unit record, a user-level interaction value may be determined per interaction type to generate a set of interaction values for that work unit record. Then, the set of interaction values may be aggregated to produce an aggregate user-level interaction value which is the "final" value for that user for that work unit record. Aggregating a set of values may include one or more of averaging the values, determining a median, determining a mode, and/or other techniques.

In some implementations, individual weights may be assigned to individual user-level interaction values as part of aggregating a set of user-level interaction values. In some implementations, individual weights may be assigned based on interaction types. Individual interaction types may correspond to individual predetermined weights. In some implementations, weights may be applied in an aggregation calculation as fractional values. By way of non-limiting illustration, weights may be expressed as values within a sliding scale in a range of zero to one, and/or other ranges. Zero may convey a lowest weight; one may convey a highest weight; and decimal values therebetween may convey various degrees of weighting an individual value. By way of non-limiting illustration, zero weight may convey no consideration; 0.25 may convey a low consideration; 0.5 may convey a neutral; 0.75 may convey a moderate consideration; and 1.0 may convey a full consideration. In some implementations, operators of the collaboration environment may specify the weights. In some implementations, a range of weights may be specified that it is possible to "overweight" a particular interaction by weights above 1 (e.g. a particular interaction type, like creating templates/automation indicates a very high level of user engagement), and/or to "penalize" a particular interaction by negative weights below zero (e.g. unsubscribing from a message thread associated with a work until record may indicate a user intentionally does not wish to engage with it).

In some implementations, interactions characterized by the domain-level interaction attribute are classified by interaction types. The interaction types may include one or more of a visitation type, work support type, a collaboration type, administrative type, and/or other types.

Interactions of the visitation type may include visitations to pages of individual records. By way of non-limiting illustration, the domain-level interaction values of the visitation type convey quantity of visitations to the individual ones of the work unit records over one or more periods of time by a set of the users, and/or other information.

Interactions of the work support type may be related to subordinate work unit records that support fulfillment of other work unit records. By way of non-limiting illustration, the domain-level interaction values of the work support type may convey one or more of quantity of sub-work supporting a given work unit record, quantity of sub-work supporting a given work unit record that have due dates and/or assignees, quantity of recently created sub-work supporting a given work unit record (with respect to a time period), quantity of completed sub-work supporting a given work unit record, quantity of incomplete sub-work supporting a given work unit record, quantity of sub-sub-work that supports the sub-work supporting a given work unit record, quantity of sections created to organize a given work unit record, quantity of deleted sub-work supporting a given work unit record, quantity of custom fields created for a given work unit record, and/or other information.

Interactions of the collaboration type may be related to collaborative actions. Collaborative actions may include one or more of commenting, attaching digital content items, adding to the membership of a given work unit record, generating a description for work, sharing a given work unit record, and/or other information. By way of non-limiting illustration, the domain-level interaction values of the collaboration type may convey one or more of quantity of comments in a given work unit record, quantity of comments in sub-work supporting a given work unit record, quantity of members of a given work unit record, and/or other information.

Interactions of the administrative type may be related to administrative characteristics of the work unit records that inherently result from creation and/or management of the work unit records. Administrative characteristics may include one or more of creation time (e.g., date and/or time of day), deletion time (e.g., date and/or time of day), privacy settings (including indication of whether privacy settings exist and/or the nature of those settings), connections or associations with other records (e.g., team a project record belongs to), and/or other information.

In some implementations, ranking component 112 may be configured to generate, for individual ones of the users, rankings of work unit records based on one or more of user-level record interaction information, domain-level record interaction information, and/or other information. In some implementations, rankings may be generated by training and utilizing a trained machine learning model (see, e.g., model component 114). A type of model particularly well adapted for the features and/or functions herein may comprise a classifier model. However, in some implementations, it may be appreciated that other types of models may be used including, but not limited to, a regression model, a pairwise-ranking model, and/or other models.

In some implementations, one or more operations of ranking component 112 may be based on a specially trained classifier model, which may output individual likelihoods that the individual ones of the users will revisit the individual ones of the work unit records in the future. The likelihoods may form the basis of the rankings. In some implementations, the likelihoods of future revisit may be expressed relative to one or more future time windows. One or more work unit records that an individual user has yet to interact with may be identified based on the presence of null or zero interaction values for those work unit records.

The ranking component 112 may be configured to provide one or more of user-level record interaction information, domain-level record interaction information, and/or other information as input into a machine learning and/or trained machine learning model (see, e.g., model component 114). As described in more detail herein, the trained machine learning model being configured to output, for the individual ones of the users and the individual ones of the work unit records, individual likelihoods that the individual ones of the users will revisit the individual ones of the work unit records.

The ranking component 112 may be configured to obtain the output of the trained machine learning model, including the individual likelihoods. The likelihoods may be expressed qualitatively and/or quantitatively. A quantitative expression of likelihood may include a numerical value within a range of values, a percentage, and/or other quantitative expressions. The ranking component 112 may be configured to generate rankings based on individual likelihoods that individual ones of the users will revisit individual ones of the work unit records. By way of non-limiting illustration, relatively higher likelihoods may be ranked relatively higher. In some implementations, the rankings may be based directly on the numerical expressions of the likelihoods. By way of non-limiting illustration, a range of values may comprise zero to 5, with zero being "no likelihood" of revisit, one being "very low likelihood" of revisit, two being "low likelihood" of revisit, three being "more likely than not" to revisit, four being "high likelihood" of revisit, and five being "very high likelihood" of revisit. By way of non-limiting illustration, a percentage may be expressed as a whole or fractional number between zero and 100, with zero being "no likelihood" of revisit, 100% being "very high likelihood" of revisit, and numbers therebetween being varying degrees of likelihood.

The individual likelihoods may be expressed with respect to one or more future time windows. The individual likelihoods may be different for each time window. By way of non-limiting illustration, an output of a trained machine learning model may express that a given user is 40% likely to revisit a given work unit record in the next week; and 75% likely to revisit the given work unit record in the next month.

By way of non-limiting illustration, a first ranking may be generated for the first user. The first ranking may include the first work unit record and/or other work unit records for which the first user has interacted with. The first work unit record may be ranked within the first ranking generated for the first user based on one or more of the first user-level interaction value (specific to the first user and the first work unit record), the first domain-level interaction value (specific to the first work unit record but related to the set of users and not the first user individually), and/or other information. The rank of the first work unit record within the first ranking may reflect a likelihood the first user will revisit the first work unit record in a first future period of time.

By way of non-limiting illustration, a second ranking may be generated for the second user. The second ranking may include the first work unit record and/or other work unit records for which the second user has interacted with. The first work unit record may be ranked within the second ranking generated for the second user based on one or more of the second user-level interaction value (specific to the second user and the first work unit record), the first domain-level interaction value (specific to the first work unit record but related to the set of users and not the second user individually), and/or other information. The rank of the first work unit record within the second ranking may reflect a likelihood the second user will revisit the first work unit record in the first future period of time.

In some implementations, the model component 114 may be configured to train one or more models to generate one or more trained models that provide the basis for operations performed by the ranking component 112. By way of non-limiting illustration, a trained model may be provided interaction information and/or other information as input. The trained model may be configured to output, for the individual ones of the users and the individual ones of the work unit records, the individual likelihoods that the individual ones of the users will revisit the individual ones of the work unit records.

In some implementations, a model may comprise one or more of a machine learning model, a probabilistic model, a decision tree model, and/or other models. In some implementations, different models may be utilized at different stages of the system 100.

In some implementations, a machine learning model may utilize one or more of an artificial neural network, naïve Bayes classifier algorithm, k-means clustering algorithm, support vector machine algorithm, linear regression, logistic regression, decision trees, random forest, nearest neighbors, matrix factorization (e.g., a class of a class of collaborative filtering algorithms), classifier model, and/or other approaches. Training a model may be based on one or more of deep learning, supervised learning, semi-supervised learning, unsupervised learning, reinforcement learning, and/or other techniques.

In supervised learning, the model may be provided with a known training dataset that includes desired inputs (e.g., historical environment state information) and outputs (e.g., indications of whether or not individual work unit record were revisited, amount and/or frequency of revisitation, and/or other information), and the model may be configured to find a method to determine how to arrive at those outputs based on the inputs. By way of non-limiting illustration, in order to output individual likelihoods that the individual ones of the users will revisit the individual ones of the work unit records in the future, a model may be trained with training input information comprising sets of interaction information (historical and/or more current information for retraining) and/or other information, and training output information comprising indication of whether individual ones of the users revisited or did not revisit the individual ones of the work unit records, and/or other desired outputs that direct the training of the model. The model may identify patterns in information, learn from observations, and/or make predictions. The model may make predictions and may be corrected by an operator—this process may continue until the model achieves a desired level of accuracy/performance. Supervised learning may utilize approaches including one or more of classification, regression, forecasting, and/or other approaches.

Semi-supervised learning may be similar to supervised learning, but instead uses both labelled and unlabeled data. Labelled data may comprise information that has meaningful tags so that the model can understand the data (e.g., outcome of prior interactions that lead or did not lead to a revisit), while unlabeled data may lack that information. By using this combination, the machine learning model may learn to label unlabeled data.

For unsupervised learning, the machine learning model may study information to identify patterns. There may be no answer key or human operator to provide instruction. Instead, the model may determine the correlations and relationships by analyzing available information (e.g., environment state information, interaction information, and/or other information). In an unsupervised learning process, the machine learning model may be left to interpret large information sets and address that information accordingly. The model may try to organize that information in some way to describe its structure. This might mean grouping the information into clusters or arranging it in a way that looks more organized. Unsupervised learning may use techniques such as clustering and/or dimension reduction.

Reinforcement learning may focus on regimented learning processes, where the machine learning model may be provided with a set of actions, parameters, and/or end values (e.g., the desired outputs). By defining the rules, the machine learning model then tries to explore different options and possibilities, monitoring and evaluating each result to determine which one is optimal to generate correspondences. Reinforcement learning teaches the model trial and error. The model may learn from past experiences and adapt its approach in response to the situation to achieve the best possible result.

The model component 114 may be configured to store a trained model in the non-transitory electronic storage 128 and/or other storage locations.

In some implementations, a model may be trained on information derived from a domain of users. The model so trained in this approach may otherwise be referred to as a "base" model from which individual user or group-specific models may be derived. Once a trained model (e.g., "base" model) has been derived from training information sets, individual user or group-specific models may be derived. The model component 114 may be configured to generate one or more user or group-specific models. In some implementations, a certain amount of newly acquired interaction information may be required in order to effectively retrain and/or otherwise adapt a base model to a specific user or group of users. In some implementations, adapting the base model may utilize incremental techniques, transfer learning, continual learning, batch-based techniques, and/or other techniques. Those skilled in the art may appreciate other techniques to adapt a base model to fit user or group-specific data that are within the scope of the present disclosure. In some implementations, training data may be partitioned into per-domain datasets, and model component 114 may be configured to parallelize the model training such that a separate model may be produced and applied to each domain.

One or more of models used by system 100 may be continually refined as time goes on. By way of non-limiting illustration, interaction information may be continuously updated as users interact with the collaboration environment, each other, and work unit records, which is then fed back into a model to further refine and/or retrain it. For example, interaction information may be obtained after passage of a preset period of time (e.g., every 6 months) and used to retrain the model. For example, interaction information may be obtained after one or more users are onboarded and/or moved to other teams or departments within a domain and used to retrain the model. Other triggers to collection of interaction information for retraining may include one or more of one or more users changing roles, new users being added, existing users leaving, and/or other considerations.

In some implementations, a model may be continually refined for specific users and/or groups of users (e.g., teams, users of a given role, etc.). By way of non-limiting illustration, information on a specific user or group of users may be collected and fed back into a trained model to further refine it specifically for that user or group. This may be part of creating a continually learning user- or group-specific models.

The user interface component 110 may be configured to effectuate presentation of instances of a user interface of the collaboration environment on client computing platform(s) 104 of the users. The user interface may provide one or more views of the collaboration environment and/or provide other features and/or functionality. The one or more views may include one or more pages of the collaboration environment and/or other content. In some implementations, an individual view of the collaboration environment may textually and/or graphically display information from one or more of a user record, a work unit record, and/or other information. By way of non-limiting illustration, a view may display one or more of a work unit page, a queue of units of work, and/or other information.

In some implementations, user interface component 110 may be configured to effectuate presentation of instances of a user interface of the collaboration environment through which the users access work unit records. The instances of the user interface may be customized for individual users based on the rankings for the individual users and/or other information. The user interface may include one or more user interface elements configured to facilitate user interaction with the user interface. By way of non-limiting illustration, user interface elements may include one or more of text input fields, drop-down menus, check boxes, display windows, virtual buttons, icons, graphics, panes, and/or other elements configured to facilitate user interaction. In some implementations, a portion of the user interface may be configured to display a set of user interface elements representing a set of work unit records as a list of the relatively highest ranks for a given user.

In some implementations, an amount of work unit records considered to be "relatively highest" ranks may be determined in a variety of ways. In some implementations, the amount may be preset by an administrator of the system, e.g., top 10 records. In some implementations, the amount may be determined by a user. By way of non-limiting illustration, a user may customize the amount of highest ranked record they want to appear in the portion of the user interface. For example, a drop down menu may be selected within the portion to allow the user to select how many records to show. In some implementations, the amount may be determined based on the type and/or capabilities of a client computing platform associated with a given user. By way of non-limiting illustration, users of desktop computers may be presented relatively longer lists of highest ranked records than users of mobile computing platforms due to at least the relative screen size differences. In some implementations, the portion displaying the relatively highest ranked work unit records may show a limited amount of record, but may be scrollable to view additional ranked records.

Effectuating presentation of a user interface may include one or more of generating user interface information defining the user interface, communicating the user interface information to client computing platform(s) 104 over network(s) 116, and/or other operations. Individual client computing platform(s) 104 may receive the user interface information. The user interface information may cause the client computing platform(s) 104 to present instances of the user interface.

By way of non-limiting illustration, a first instance of the user interface may be customized for the first user based on the first ranking and/or other information. The first instance may be customized by displaying a first set of user interface elements corresponding to a first set of work unit records having the relatively highest ranks within the first ranking. By way of non-limiting illustration, a second instance of the user interface may be customized for the second user based on the second ranking and/or other information. The second instance may be customized by displaying a second set of user interface elements corresponding to a second set of work unit records having the relatively highest ranks within the second ranking.

The user interface may be configured to receive user input into the instances of the user interface. The user input may include selection of individual user interface elements corresponding to the individual ones of the work unit records displayed in the portion of the user interface that shows the rankings. In response to obtaining entry and/or selection into the user interface, one or more actions may be carried out. In some implementations, the actions may include one or more of navigating to individual work unit pages of individual work unit records corresponding to the selected ones of the user interface elements, triggering an update or refinement of the trained machine learning model, and/or other actions.

The user interface component 110 may be configured to obtain and/or generate user input information conveying the entry and/or selection within the instance of the user interface at the client computing platform(s) 104. The user input information may be stored in non-transitory electronic storage 128 and/or other storage locations. In some implementations, interactions at the client computing platforms 104 comprising the entry and/or selection within the instances of the user interface may be communicated to user interface component 110 such that user interface component 110 may generate the user input information. In some implementations, individual client computing platforms may generate the user input information based on the user entry and/or selection and communicate the user input information to the user interface component 110. By way of non-limiting illustration, the user input information may convey first user input by the first user into the first instance of the user interface and/or other user input. The first user input may include a selection of a first user interface element in the first set of user interface elements displayed to the first user. The first user interface element may correspond to the first work unit record.

The user interface component 110 may be configured to, responsive to obtaining the user input information, cause the instances of the user interface to navigate to work unit pages of selected ones of the work unit records and/or perform other actions. By way of non-limiting illustration, responsive to the first user input, user interface component 110 may be configured to cause the first instance of the user interface to navigate to a first work unit page of the first work unit record.

In some implementations, navigating to work unit pages may include one or more of presenting a new user interface, displaying a user interface portion, presenting a pop-up window, and/or other navigation that leads to presentation of the work unit pages. This way, a user may further view a work unit page for a ranked work unit record, communicate with other users (e.g., members) of the ranked work unit record, and/or perform other actions.

In some implementations, ranking component 112 may be configured to learn user preferences based selection (or non-selection) of user interface elements representing highly ranked work unit records. By way of non-limiting illustration, in response to selection of a ranked work unit record by a user, ranking component 112 may be configured to increase the rank of that work unit record. By way of non-limiting illustration, in response to no selection of a ranked work unit record by a user after a given period of time, ranking component 112 may be configured to decrease the rank of that work unit record.

Figure 3:
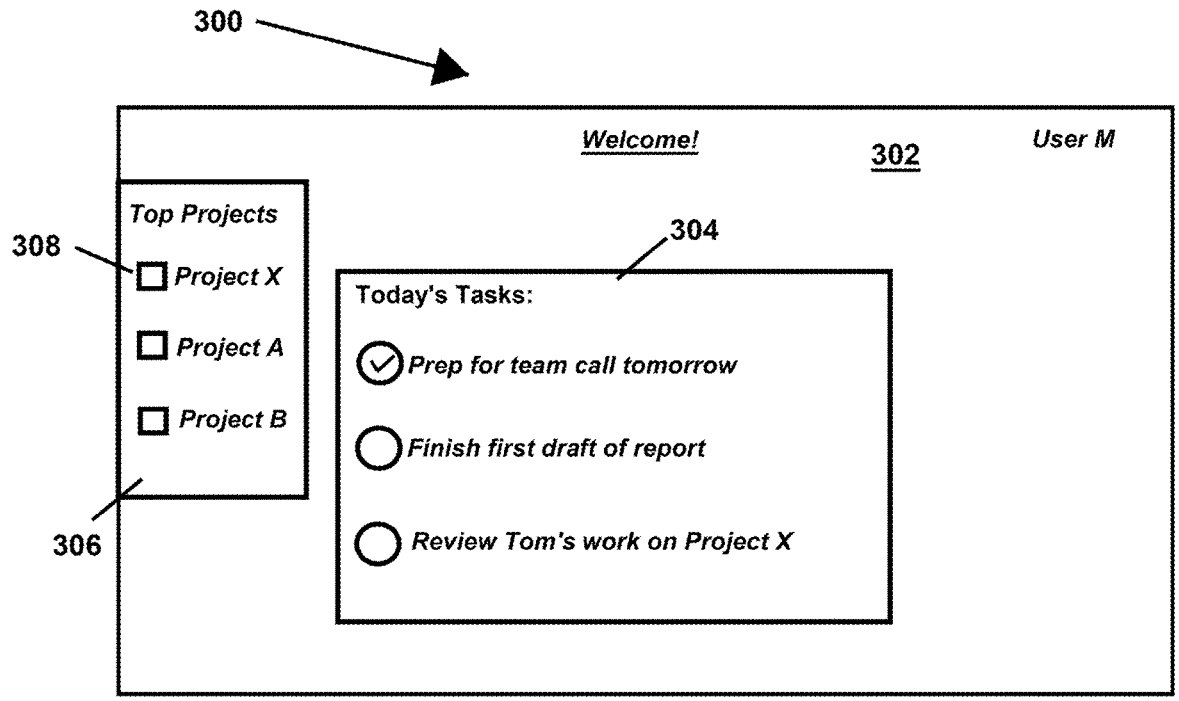
FIG. 3 illustrates a user interface, in accordance with one or more implementations.

FIG. 3 illustrates a user interface 300 of a collaboration environment, in accordance with one or more implementations. The user interface 300 may include a view 302 of a collaboration environment. In particular, the user interface 300 may display a queue 304 including one or more work unit records assigned to a user (e.g., User M). In accordance with one or more implementations of the present disclosure, the user interface 300 may be customized for the user based on a ranking of work unit records. By way of non-limiting illustration, the user interface 300 may include a portion 306 displaying a set of user interface elements corresponding to a set of work unit records having a relatively highest ranks within the ranking. By way of non-limiting illustration, a first work unit record (e.g., Project X) may be ranked within the ranking generated for the user based on the user-level interaction specific to the user, and the domain-level interaction information specific to a set of users that includes the user (e.g., a domain of users that includes User M). The first work unit record may be presented by first user interface element 308 in the portion 306.

Figure 4:
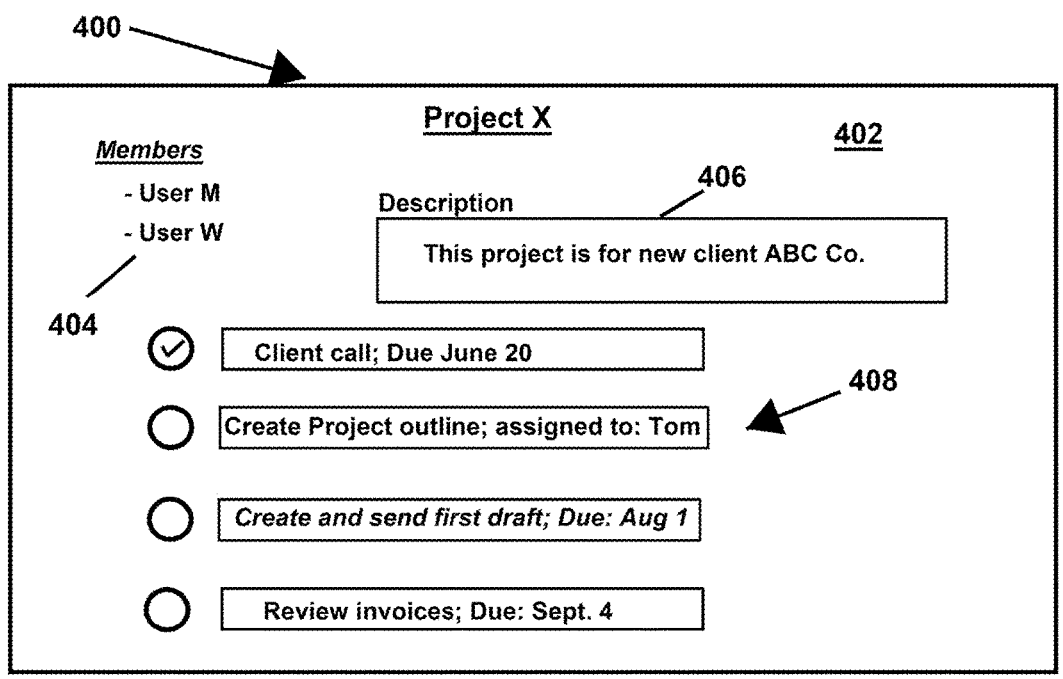
FIG. 4 illustrates a user interface, in accordance with one or more implementations.

FIG. 4 illustrates a user interface 400 of a collaboration environment, in accordance with one or more implementations. The user interface 400 may include a view of a collaboration environment. In particular, the user interface 400 may comprise a work unit page 402 for the first work unit record (e.g., Project X) that was ranked and presented in the user interface 300 of FIG. 3. The user interface 400 may be presented in response to selection of user interface element 308 of FIG. 3. The user interface 400 may display and/or provide access to values of one or more parameters of the first work unit record. By way of non-limiting illustration, user interface 400 may include one or more of a user interface element 404 displaying a list of members of the first work unit record, a user interface element 406 displaying a description of the first work unit record, user interface element 408 displaying a list of other work unit records that support the first work unit record (e.g., tasks that support fulfillment of Project X), and/or other content.

FIGS. 3 and 4 are provided for illustrative purposes only and are not to be considered limiting. Instead, those skilled in the art may appreciate other configurations and/or displays within user interfaces that may be provided in order to achieve the features and/or functionally described herein.

Referring back to FIG. 1, in some implementations, server(s) 102, client computing platform(s) 104, and/or external resources 126 may be operatively linked via one or more electronic communication links. For example, such electronic communication links may be established, at least in part, via network(s) 116 such as the Internet and/or other networks. It will be appreciated that this is not intended to be limiting, and that the scope of this disclosure includes implementations in which server(s) 102, client computing platform(s) 104, and/or external resource(s) 126 may be operatively linked via some other communication media.

A given client computing platform may include one or more processors configured to execute computer program components. The computer program components may be configured to enable an expert or user associated with the given client computing platform to interface with system 100 and/or external resource(s) 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resource(s) 126 may include sources of information outside of system 100, external entities participating with system 100, and/or other resources. In some implementations, some or all of the functionality attributed herein to external resource(s) 126 may be provided by resources included in system 100.

Server(s) 102 may include electronic storage 128, one or more processors 130, and/or other components. Server(s) 102 may include communication lines, or ports to enable the exchange of information with network(s) 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, and/or 114 are illustrated in FIG. 1 as being implemented within a single processing unit, in implementations in which processor(s) 130 includes multiple processing units, one or more of components 108, 110, 112, and/or 114 may be implemented remotely from the other components. The description of the functionality provided by the different components 108, 110, 112, and/or 114 described below is for illustrative purposes, and is not intended to be limiting, as any of components 108, 110, 112, and/or 114 may provide more or less functionality than is described. For example, one or more of components 108, 110, 112, and/or 114 may be eliminated, and some or all of its functionality may be provided by other ones of components 108, 110, 112, and/or 114. As another example, processor(s) 130 may be configured to execute one or more additional components that may perform some or all of the functionality attributed below to one of components 108, 110, 112, and/or 114.

Figure 2:
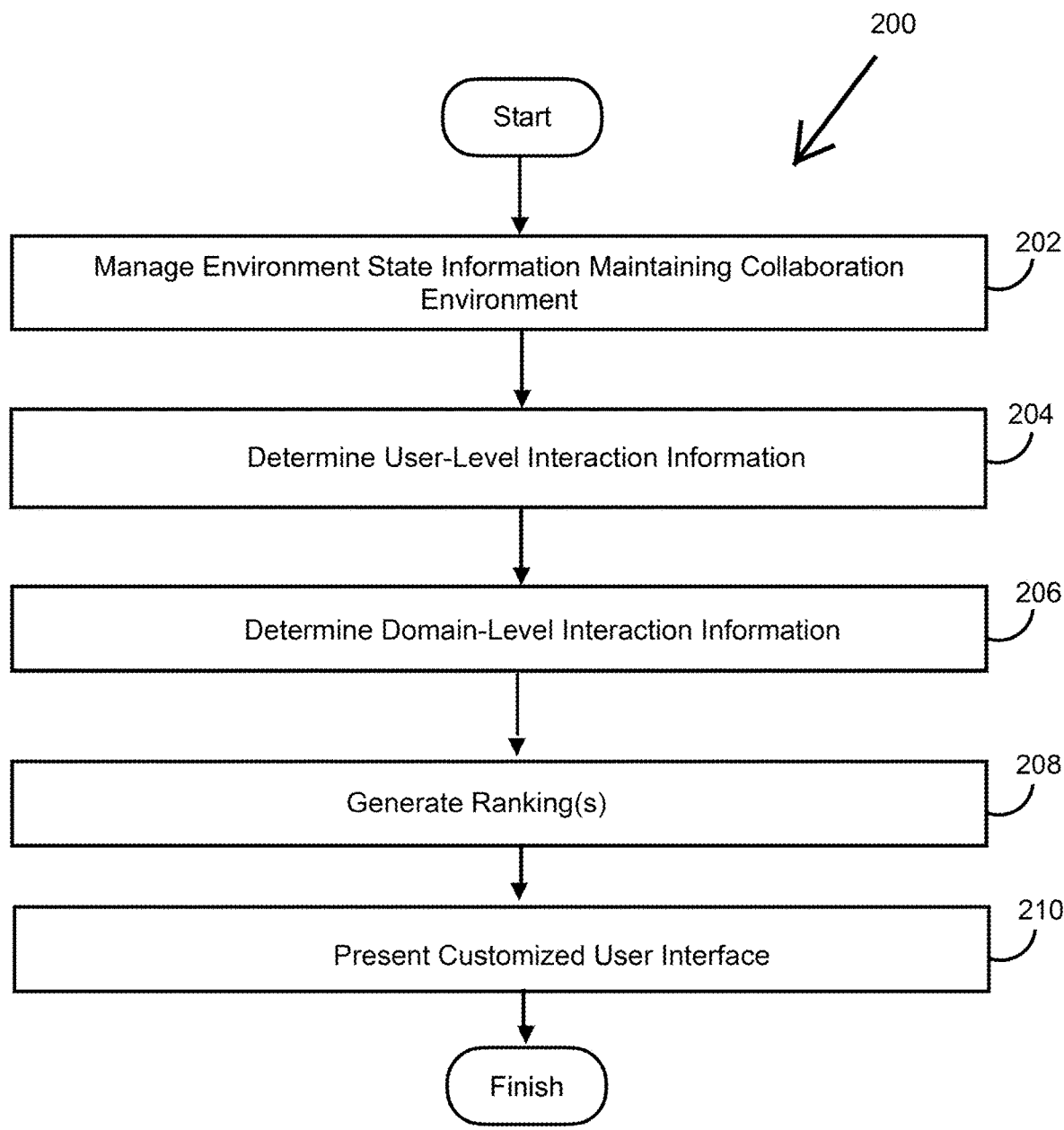
FIG. 2 illustrates a method to customize a user interface of a collaboration environment based on ranking of work unit records managed by the collaboration environment, in accordance with one or more implementations.

FIG. 2 illustrates a method 200 to customize a user interface of a collaboration environment based on ranking of work unit records managed by the collaboration environment, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may manage environment state information maintaining a collaboration environment. The collaboration environment may be configured to facilitate interaction by users with the collaboration environment. The environment state information may include work unit records and/or other records. The work unit records may describe units of work managed, created, and/or assigned within the collaboration environment. Operation 202 may be performed by one or more hardware processors configured by machine-readable instructions including a component that is the same as or similar to environment state component 108 (shown in FIG. 1 and described herein), in accordance with one or more implementations.

An operation 204 may determine user-level record interaction information and/or other information. The user-level record interaction information may include user-level interaction values for a user-level interaction attribute and/or other information. The user-level interaction attribute may characterize interactions of individual ones of the users with individual ones of the work unit records. An individual user-level interaction value may correspond to an individual one of the work unit records and an individual one of the users. By way of non-limiting illustration, the user-level record interaction information may include one or more of a first user-level interaction value corresponding to a first user and a first work unit record, a second user-level interaction value corresponding to a second user and the first work unit record, and/or other user-level interaction values. Operation 204 may be performed by one or more hardware processors configured by machine-readable instructions including a component that is the same as or similar to environment state component 108 (shown in FIG. 1 and described herein), in accordance with one or more implementations.

An operation 206 may determine domain-level record interaction information and/or other information. The domain-level record interaction information may include domain-level interaction values for a domain-level interaction attribute. The domain-level interaction attribute may characterize interactions of a set of the users with the individual ones of the work unit records. An individual domain-level interaction value may correspond to an individual one of the work unit records and the set of the users, such that the individual domain-level interaction value makes no reference to any particular user. By way of non-limiting illustration, the domain-level record interaction information may include a first domain-level interaction value corresponding to the first work unit record and the set of the users, and/or other information. Operation 206 may be performed by one or more hardware processors configured by machine-readable instructions including a component that is the same as or similar to environment state component 108 (shown in FIG. 1 and described herein), in accordance with one or more implementations.

An operation 208 may generate, for individual ones of the users, rankings of work unit records based on one or more of the user-level record interaction information, the domain-level record interaction information, and/or other information. By way of non-limiting illustration, the first work unit record may be ranked within a first ranking generated for the first user based on one or more of the first user-level interaction value, the first domain-level interaction value, and/or other information. By way of non-limiting illustration, the first work unit record may be ranked within a second ranking generated for the second user based on one or more of the second user-level interaction value, the first domain-level interaction value, and/or other information. Operation 208 may be performed by one or more hardware processors configured by machine-readable instructions including a component that is the same as or similar to ranking component 112 (shown in FIG. 1 and described herein), in accordance with one or more implementations.

An operation 210 may effectuate presentation of instances of a user interface of the collaboration environment through which the users access work unit record. The instances of the user interface may be customized for individual users based on the rankings for the individual users and/or other information. In some implementations, a portion of the user interface may be configured to display work unit records having relatively highest ranks for a given user. By way of non-limiting illustration, a first instance of the user interface may be customized for the first user based on the first ranking and/or other information. The first instance may be customized by displaying a first set of user interface elements corresponding to a first set of work unit records having the relatively highest ranks within the first ranking. By way of non-limiting illustration, a second instance of the user interface may be customized for the second user based on the second ranking and/or other information. The second instance may be customized by displaying a second set of user interface elements corresponding to a second set of work unit records having the relatively highest ranks within the second ranking. Operation 210 may be performed by one or more hardware processors configured by machine-readable instructions including a component that is the same as or similar to user interface component 110 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to customize a user interface of a collaboration environment based on ranking of work unit records managed by the collaboration environment, the system comprising:
one or more physical processors configured by machine-readable instructions to:
manage environment state information maintaining a collaboration environment, the collaboration environment being configured to facilitate interaction by users with the collaboration environment, the environment state information including work unit records, the work unit records describing units of work managed, created, and/or assigned within the collaboration environment;
determine user-level record interaction information, the user-level record interaction information conveying user-level interaction values for a user-level interaction attribute, the user-level interaction attribute characterizing interactions of individual ones of the users with individual ones of the work unit records, an individual user-level interaction value corresponding to an individual one of the work unit records and an individual one of the users, the user-level record interaction information including a first user-level interaction value corresponding to a first user and a first work unit record, and a second user-level interaction value corresponding to a second user and the first work unit record;
determine domain-level record interaction information, the domain-level record interaction information conveying domain-level interaction values for a domain-level interaction attribute, the domain-level interaction attribute characterizing the interactions of a set of the users with the individual ones of the work unit records, an individual domain-level interaction value corresponding to the individual one of the work unit records and the set of the users, the domain-level record interaction information including a first domain-level interaction value corresponding to the first work unit record and the set of the users;

generate, for the individual ones of the users, rankings of the work unit records based on the user-level record interaction information and the domain-level record interaction information, such that the first work unit record is ranked within a first ranking generated for the first user based on the first user-level interaction value and the first domain-level interaction value, and the first work unit record is ranked within a second ranking generated for the second user based on the second user-level interaction value and the first domain-level interaction value; and effectuate presentation of instances of a user interface of the collaboration environment through which the users access the work unit records, wherein the instances of the user interface are customized for the individual ones of the users based on the rankings for the individual ones of the users such that a portion of the user interface is configured to display the work unit records having relatively highest ranks, such that a first instance of the user interface is customized for the first user based on the first ranking by displaying a first set of user interface elements corresponding to a first set of work unit records having the relatively highest ranks within the first ranking, and a second instance of the user interface is customized for the second user based on the second ranking by displaying a second set of user interface elements corresponding to a second set of work unit records having the relatively highest ranks within the second ranking.

2. The system of claim 1, wherein the one or more physical processors are further configured by the machine-readable instructions to generate the rankings by:

providing the user-level record interaction information and the domain-level record interaction information as input into a trained machine learning model, the trained machine learning model being configured to output, for the individual ones of the users and the individual ones of the work unit records, individual likelihoods that the individual ones of the users will revisit the individual ones of the work unit records;

obtaining the output of the trained machine learning model including the individual likelihoods; and determine the rankings based on the individual likelihoods, such that relatively higher likelihoods are ranked relatively higher.

3. The system of claim 2, wherein the trained machine learning model is a classifier model.

4. The system of claim 1, wherein the one or more physical processors are further configured by the machine-readable instructions to:

obtain user input information conveying user input into the instances of the user interface, the user input including selection of individual user interface elements corresponding to the individual ones of the work unit records displayed in the portion of the user interface, such that the user input information conveys first user input by the first user into the first instance of the user interface, the first user input including a selection of a first user interface element in the first set of user interface elements, the first user interface element corresponding to the first work unit record; and responsive to obtaining the user input information, cause the instances of the user interface to navigate to work unit pages of selected ones of the work unit records, such that responsive to the first user input, cause the first instance of the user interface to navigate to a first work unit page of the first work unit record.

5. The system of claim 1, wherein the work unit records comprise project records for projects managed within the collaboration environment.

6. The system of claim 1, wherein the interactions characterized by the user-level interaction attribute are classified by interaction types, the interaction types including a visitation type, work completion type, and a collaboration type.

7. The system of claim 6, wherein:

the user-level interaction values of the visitation type convey quantity of visitations to the individual ones of the work unit records over one or more periods of time;

the user-level interaction values of the work completion type convey one or more of quantity of completed supporting work, quantity of supporting work with due dates, or quantity of supporting work currently assigned; and the user-level interaction values of the collaboration type convey length of membership to the individual ones of the work unit records.

8. The system of claim 1, wherein the interactions characterized by the domain-level interaction attribute are classified by interaction types, the interaction types including a visitation type, work support type, an administrative type, and a collaboration type.

9. The system of claim 8, wherein:

the domain-level interaction values of the visitation type convey quantity of visitations to the individual ones of the work unit records over one or more periods of time by the set of the users;

the domain-level interaction values of the work support type are related to sub-work unit records that support fulfillment of the work unit records; and the domain-level interaction values of the collaboration type are related to comments and attachments.

10. The system of claim 1, wherein the user-level record interaction information disregards, for the individual ones of the users, the work unit records that the individual ones of the users have yet to interact with.

11. A method to customize a user interface of a collaboration environment based on ranking of work unit records managed by the collaboration environment, the method comprising:

managing environment state information maintaining a collaboration environment, the collaboration environment being configured to facilitate interaction by users with the collaboration environment, the environment state information including work unit records, the work unit records describing units of work managed, created, and/or assigned within the collaboration environment;

determining user-level record interaction information, the user-level record interaction information conveying user-level interaction values for a user-level interaction attribute, the user-level interaction attribute characterizing interactions of individual ones of the users with individual ones of the work unit records, an individual user-level interaction value corresponding to an individual one of the work unit records and an individual one of the users, the user-level record interaction information including a first user-level interaction value corresponding to a first user and a first work unit record, and a second user-level interaction value corresponding to a second user and the first work unit record;

determining domain-level record interaction information, the domain-level record interaction information conveying domain-level interaction values for a domain-level interaction attribute, the domain-level interaction attribute characterizing the interactions of a set of the users with the individual ones of the work unit records, an individual domain-level interaction value corresponding to the individual one of the work unit records and the set of the users, the domain-level record interaction information including a first domain-level interaction value corresponding to the first work unit record and the set of the users;

generating, for the individual ones of the users, rankings of the work unit records based on the user-level record interaction information and the domain-level record interaction information, including generating a first ranking based on the first user-level interaction value and the first domain-level interaction value, the first ranking including the first work unit record, and generating a second ranking for the second user based on the second user-level interaction value and the first domain-level interaction value, the second ranking include the first work unit record; and effectuating presentation of instances of a user interface of the collaboration environment through which the users access the work unit records, wherein the instances of the user interface are customized for the individual ones of the users based on the rankings for the individual ones of the users such that a portion of the user interface is configured to display the work unit records having relatively highest ranks, including effectuating presentation of a first instance of the user interface that is customized for the first user based on the first ranking by displaying a first set of user interface elements corresponding to a first set of work unit records having the relatively highest ranks within the first ranking, and effectuating presentation of a second instance of the user interface customized for the second user based on the second ranking by displaying a second set of user interface elements corresponding to a second set of work unit records having the relatively highest ranks within the second ranking.

12. The method of claim 11, wherein the generating the rankings comprises:

providing the user-level record interaction information and the domain-level record interaction information as input into a trained machine learning model, the trained machine learning model being configured to output, for the individual ones of the users and the individual ones of the work unit records, individual likelihoods that the individual ones of the users will revisit the individual ones of the work unit records;

obtaining the output of the trained machine learning model including the individual likelihoods; and determine the rankings based on the individual likelihoods, such that relatively higher likelihoods are ranked relatively higher.

13. The method of claim 12, wherein the trained machine learning model is a classifier model.

14. The method of claim 11, further comprising:

obtaining user input information conveying user input into the instances of the user interface, the user input including selection of individual user interface elements corresponding to the individual ones of the work unit records displayed in the portion of the user interface, the user input information conveying first user input by the first user into the first instance of the user interface, the first user input including a selection of a first user interface element in the first set of user interface elements, the first user interface element corresponding to the first work unit record; and responsive to obtaining the user input information, causing the instances of the user interface to navigate to work unit pages of selected ones of the work unit records, including responsive to the first user input, causing the first instance of the user interface to navigate to a first work unit page of the first work unit record.

15. The method of claim 11, wherein the work unit records comprise project records for projects managed within the collaboration environment.

16. The method of claim 11, wherein the interactions characterized by the user-level interaction attribute are classified by interaction types, the interaction types including a visitation type, work completion type, and a collaboration type.

17. The method of claim 16, wherein:

the user-level interaction values of the visitation type convey quantity of visitations to the individual ones of the work unit records over one or more periods of time;

the user-level interaction values of the work completion type convey one or more of quantity of completed supporting work, quantity of supporting work with due dates, or quantity of supporting work currently assigned; and the user-level interaction values of the collaboration type convey length of membership to the individual ones of the work unit records.

18. The method of claim 11, wherein the interactions characterized by the domain-level interaction attribute are classified by interaction types, the interaction types including a visitation type, work support type, an administrative type, and a collaboration type.

19. The method of claim 18, wherein:

the domain-level interaction values of the visitation type convey quantity of visitations to the individual ones of the work unit records over one or more periods of time by the set of the users;

the domain-level interaction values of the work support type are related to sub-work unit records that support fulfillment of the work unit records; and the domain-level interaction values of the collaboration type are related to comments and attachments.

20. The method of claim 11, wherein the user-level record interaction information disregards, for the individual ones of the users, the work unit records that the individual ones of the users have yet to interact with.

* * * * *